United States Patent
Nishina et al.

(10) Patent No.: US 8,081,355 B2
(45) Date of Patent: Dec. 20, 2011

(54) ILLUMINATION UNIT, IMAGE READ APPARATUS, IMAGE FORMATION APPARATUS

(75) Inventors: Kiichiro Nishina, Yokohama (JP); Yasuo Sakurai, Yokohama (JP); Masahiro Itoh, Sagamihara (JP); Hibiki Tatsuno, Kawasaki (JP); Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 972 days.

(21) Appl. No.: 12/035,782

(22) Filed: Feb. 22, 2008

(65) Prior Publication Data
US 2008/0218724 A1 Sep. 11, 2008

(30) Foreign Application Priority Data

Mar. 5, 2007 (JP) ................. 2007-054740
Mar. 8, 2007 (JP) ................. 2007-058195
Mar. 13, 2007 (JP) ................. 2007-063932

(51) Int. Cl.
*H04N 1/04* (2006.01)
(52) U.S. Cl. ........................ 358/474; 358/475
(58) Field of Classification Search .................. 358/475, 358/474, 500, 509, 520, 480, 482
See application file for complete search history.

(56) References Cited

U.S. PATENT DOCUMENTS

| | | | |
|---|---|---|---|
| 4,623,937 A * | 11/1986 | Watanabe ..................... | 358/483 |
| 4,638,987 A | 1/1987 | Sakurai | |
| 4,715,597 A | 12/1987 | Sakurai | |
| 7,209,702 B2 | 4/2007 | Kohchi et al. | |
| 2005/0088707 A1 | 4/2005 | Sakurai et al. | |
| 2005/0111115 A1 | 5/2005 | Tatsuno et al. | |
| 2005/0195452 A1 | 9/2005 | Tatsuno | |
| 2006/0001880 A1* | 1/2006 | Stober ........................... | 356/406 |
| 2006/0007417 A1 | 1/2006 | Tatsuno | |
| 2006/0008295 A1 | 1/2006 | Kohchi et al. | |
| 2006/0044795 A1 | 3/2006 | Tatsuno | |
| 2006/0092315 A1* | 5/2006 | Payonk et al. ................ | 348/370 |
| 2006/0104684 A1 | 5/2006 | Kohchi et al. | |
| 2006/0187500 A1 | 8/2006 | Sakurai | |
| 2006/0197822 A1 | 9/2006 | Sakurai | |
| 2006/0279961 A1 | 12/2006 | Sakurai | |
| 2007/0024977 A1 | 2/2007 | Kawamura et al. | |
| 2007/0115465 A1* | 5/2007 | Coyle et al. ................. | 356/239.2 |
| 2007/0206296 A1 | 9/2007 | Itoh et al. | |
| 2007/0216969 A1 | 9/2007 | Nishina | |

FOREIGN PATENT DOCUMENTS

| | | |
|---|---|---|
| JP | 08-317133 | 11/1996 |
| JP | 3649939 B | 10/2000 |
| JP | 2004-212592 | 7/2004 |
| JP | 2005-234109 | 9/2005 |
| JP | 2005-241681 | 9/2005 |
| JP | 2005-278132 | 10/2005 |
| JP | 2006-025303 | 1/2006 |

* cited by examiner

*Primary Examiner* — Jerome Grant, II
(74) *Attorney, Agent, or Firm* — Dickstein Shapiro LLP

(57) ABSTRACT

An illumination unit for use in an image read apparatus is provided which illuminates a surface of an original document with illumination light, reads an image of the original document by a light receiving element, and adjusts an amount of specular light reflection from the surface of the original document on a light receiving plane of the light receiving element by adjusting at least one of an incident angle of the illumination light and a divergence thereof. It includes a plurality of light source units emitting the illumination light and arranged in a direction so that a direction in which intensity of light emitted from at least one of the light source units closest to a center of the arrangement thereof is to be highest makes a non-perpendicular angle with the direction of arrangement.

19 Claims, 17 Drawing Sheets

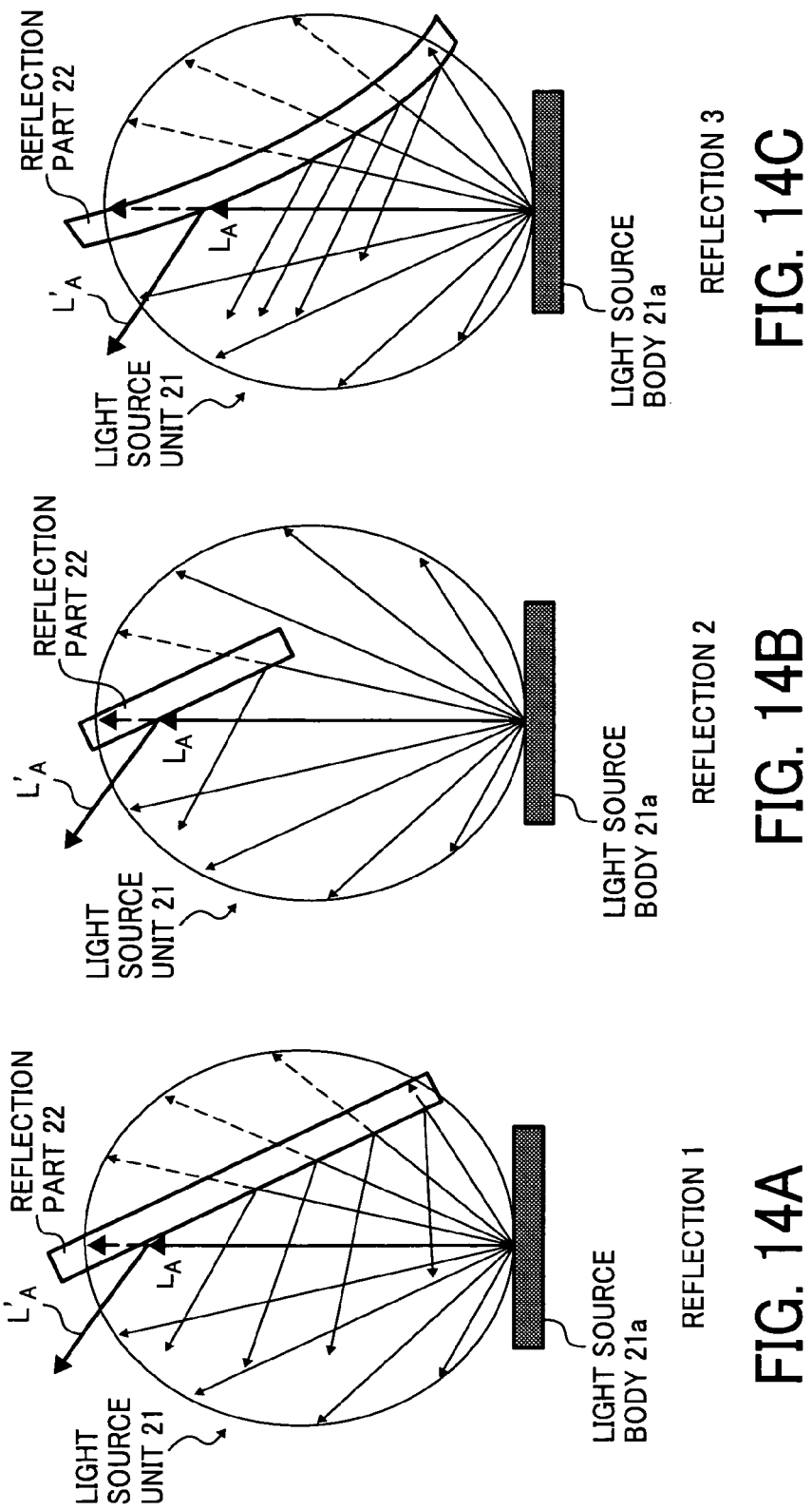

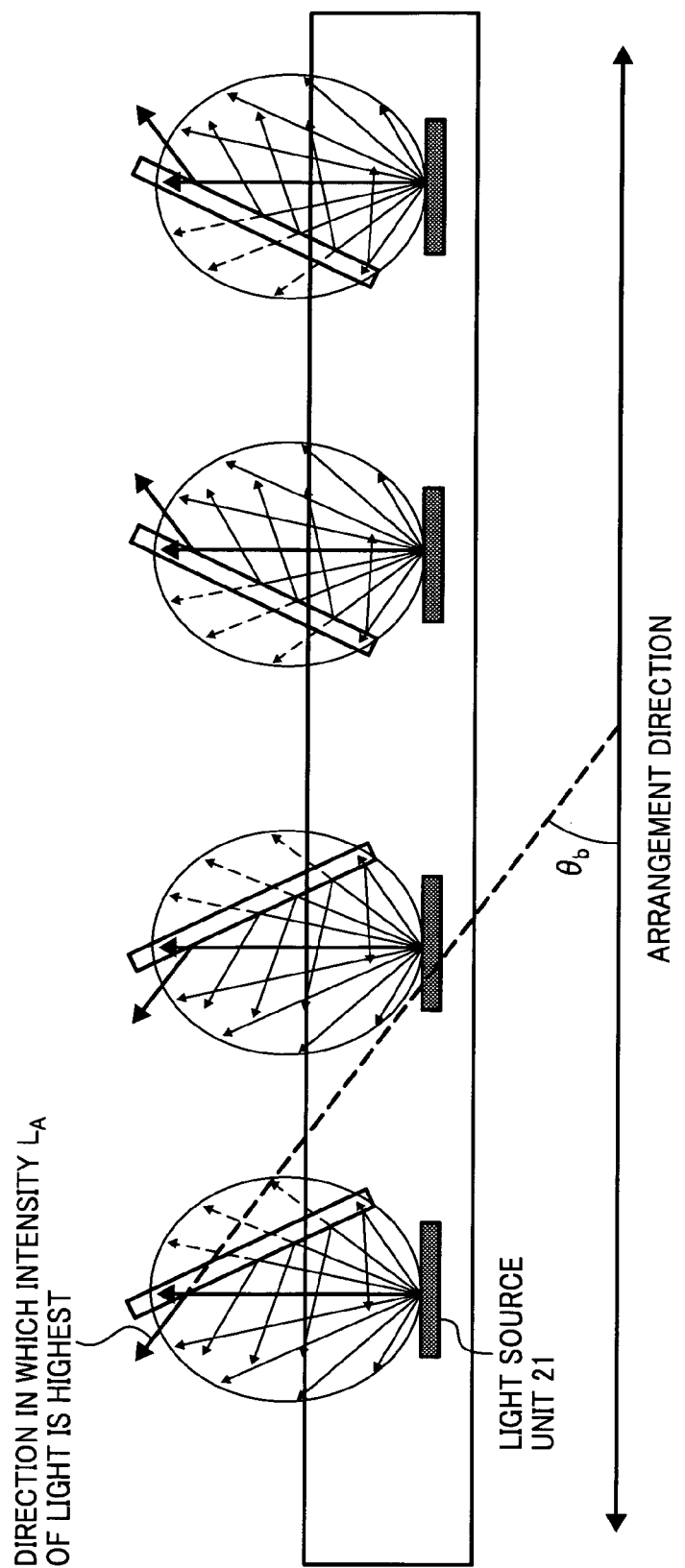

SPECULAR LIGHT REFLECTION FROM PORTION
OF DOCUMENT NOT IN CONTACT WITH PLATEN
IS CONVERGED BY FOCUS LENS

ILLUMINATION UNIT, IMAGE READ APPARATUS, IMAGE FORMATION APPARATUS

CROSS-REFERENCE TO RELATED APPLICATIONS

The present application is based on and claims priority from Japanese Patent Application No. 2007-54740, filed on Mar. 5, 2007, No. 2007-58195, filed on Mar. 8, 2007, and No. 2007-63932, filed on Mar. 13, 2007, the disclosure of which is hereby incorporated by reference in its entirety.

BACKGROUND OF THE INVENTION

Field of the Invention

The present invention relates to an illumination unit which emits light to a document to be read, an image read apparatus which reads data and information on the document, and an image formation apparatus such as a digital copier.

Heretofore, tube lamps such as a xenon lamp or a halogen lamp have been generally used for a light source of the image read apparatus. However, they are disadvantageous in large power consumption and large heat emission, causing an increase in temperature of the entire image read apparatus. The temperature increase in the image read apparatus causes a problem that it impairs a conjugation of an optical system to deviate the focal point thereof relative to a light receiving element, preventing good image formation.

Under such circumstances, an illumination unit using an LED light source has attracted attention as a new light source for the image read apparatus in replace of the tube lamp because of the LED's less power consumption and less heat emission. For example, Japanese Laid-open Patent Application Publication No. 2006-25303 discloses an illumination unit using the LED light source in which LEDs are arranged in a line to illuminate an original document via an optical guiding body. Japanese Laid-open Patent Application Publication No. 2005-278132 discloses another illumination unit in which a lens system of a long length is provided ahead of the arranged LEDs for the purpose of improving focus of illumination in a direction perpendicular to the arrangement of the LEDs.

Further, Japanese Laid-open Patent Application Publication No. 2005-241681 discloses an illumination unit in which a light from the LED is reflected by a reflective mirror to illuminate an original document. Japanese Laid-open Patent Application Publication No. 2004-212592 and No. Hei 8-317133 disclose an illumination unit with LEDs to be inclined.

FIG. 22 is a side view of a contact glass 1 as a document platen of an image read apparatus on which an original document 2 is placed. As shown in the drawing, the apparatus with an illumination unit using either an LED or a tube lamp is configured not to read, by light receiving element, a reflected light from the original document 2 on the contact glass 1 in a specular direction in which a larger amount of light is reflected. This is because in the specular direction not only the reflected light from the original document 2 but also reflected light from the surface of the platen 1 are large in amount, making it impossible to read image information on the document accurately. Generally, the illumination unit 10 is disposed diagonally relative to the original document and configured that the light receiving element reads reflected light only in a direction perpendicular to the original document 2. In this manner it is possible to accurately read the image information only on the document 2, excluding an influence from the reflected light from the surface of the platen 1.

Furthermore, Japanese Laid-open Patent Application Publication No. 2005-234109 discloses a document illumination unit using an LED configured to illuminate a periphery portion of the document to be read with a larger amount of light than a center portion thereof. Also, Japanese Patent No. 3649939 discloses a line light source apparatus in which a plurality of LEDs are arranged to reduce unevenness of illumination in a direction of the arrangement of LEDs.

However, a problem may arise even when the original document is illuminated diagonally as described above. As shown in FIG. 23A, for example, in a case where a book b is to be read, a bound portion thereof such as inside margins cannot be made in direct contact with the platen so that specular light reflection from the bound portion may emit in a direction perpendicular to the surface of the platen. This causes a problem that a larger amount of specular light reflection is directly captured into the light receiving element than a normal amount of light at reading general documents, an image of the book is read with occurrence of so-called halation in the bound portion.

Another problem is in that in the illumination unit using the LED the specular light reflection contains the image of the LED itself so that circular halation occurs around the bound portion of the book b at image reading as shown in FIG. 23B. Such a phenomenon is likely to occur when the illumination unit uses the LED with high directivity while it is unlikely to occur when it uses the tube lamp such as a xenon lamp which is a diffusive light source. Especially, it is very likely to occur in reading glossy documents. Also, the halation often occurs with use of an optical system with a large focal depth for reducing image data. However, even with the highly directional LED, it is unlikely to occur in a unity magnification imaging element with a small focal depth such as a contact-type image sensor.

The prior art illumination units fail to deal with the above problems. For example, the illumination unit having the inclined LEDs in Japanese Laid-open Patent Application Publication Nos. 2004-212592 and Hei 8-317133 is directed not to solve the above-identified problems but to compensate for reduction in peripheral brightness of an optical imaging system. Moreover, they discloses the illumination unit only in which all the LEDs are arranged in the same direction, and fail to disclose means to reduce an influence of the specular light reflection from the portion of the document separated from the platen.

Further, the illumination unit having the light source unit and reflection unit in Japanese Patent No. 3649939 is intended to decrease unevenness of illumination to the surface of the document disposed in contact with the platen, and does not aim to solve the above-identified problems; therefore, it cannot reduce an influence of the specular light reflection from the portion of the document separated from the platen, neither.

SUMMARY OF THE INVENTION

An object of the present invention is to provide an illumination unit which illuminates a document in such a manner as to obtain good reflected light therefrom even when the document includes a portion not in contact with the platen. Another object of the present invention is to provide an illumination unit which utilizes light efficiently to consume less power, thereby contributing to energy saving and conservation of global environment, as well as to provide an image read apparatus and an image formation apparatus including the illumination unit.

According to one aspect of the present invention, an illumination unit for use in an image read apparatus illuminates a surface of an original document with illumination light reads an image of the original document by a light receiving element, and adjusts an amount of specular light reflection from the surface of the original document on a light receiving plane of the light receiving element by adjusting at least one of an incident angle of the illumination light and a divergence thereof.

According to another aspect of the present invention, the illumination unit comprises a plurality of light source units arranged in a direction and emitting light as the illumination light, in which the light source units are arranged so that a direction in which intensity of light emitted from at least one of the light source units is to be highest makes a non-perpendicular angle with the direction of arrangement of the light source units, the at least one of the light source units being closest to a center of the arrangement.

Further, according to another aspect of the present invention, the illumination unit comprises a plurality of light source units arranged in a direction and emitting light as the illumination light, in which the light source units are arranged so that a direction in which intensity of light emitted from at least one of the light source units is to be highest makes a non-perpendicular angle with the direction of arrangement of the light source units and that directions in which intensity of light emitted from the respective light source units is to be highest are different from each other, the at least one of the light source units being closest to a center of the arrangement.

Preferably, in the illumination unit, the light source units each comprise a light source body emitting the light and a reflection part reflecting all or a part of the light emitted from the light source body to change a direction thereof, the part of the light including light with highest intensity.

Preferably, in the illumination unit, the plurality of light source units are arranged so as to satisfy the following expression:

$$\theta b < 90° - 0.5 * \theta a$$

where $\theta a$ is a half-value angle of intensity of the light emitted from the light source unit and $\theta b$ is an angle between a direction in which intensity of light emitted from the at least one of the light source units is to be highest and the direction of arrangement.

Further, preferably the illumination unit further comprises one of a mirror and an optical guiding body reflecting the light emitted from the light source units.

Preferably, in the illumination unit, a number of the light source units is an even number and the light source units are arranged symmetrically with respect to the center of the arrangement.

According to another aspect of the invention, the illumination unit comprises a plurality of light source units arranged in a direction and emitting light as the illumination light, in which the light source units are arranged so as to satisfy the following expression:

$$\theta a \leq D/30$$

where $\theta a$ is a half-value angle of intensity of the light emitted from the light source units and D is a length of an exit plane of the light in the direction of arrangement of the light source units. In this illumination unit, preferably, the light source units each comprise a light source body emitting the light and a reflection part reflecting the light emitted from the light source body. Further, preferably, the reflection part reflects the light emitted from the light source body in a direction substantially perpendicular to the direction of the arrangement of the light source units. Further, preferably, the reflection part comprises a reflective surface which is a diffusive surface. Preferably, a number of the light source units is an even number and the light source units are arranged symmetrically with respect to the center of the arrangement.

According to another aspect of the present invention, an image read apparatus comprises the above-described illumination unit; a light receiving element converting an optical signal to an electric signal; and an optical imaging system imaging, on the light receiving element, reflected light from a surface of an original document which has been illuminated by the illumination unit.

According to another aspect of the present invention, an image formation apparatus comprises the above-described image read apparatus and an image formation unit forming an image according to an image of an original document read by the image read apparatus.

BRIEF DESCRIPTION OF THE DRAWINGS

FIGS. 14A, 14B, 14C explain schematic configuration of the light source unit and exit direction of light therefrom according to the second embodiment of the present invention;

FIG. 15 is an explanatory view for exit direction of light from the light source unit according to the second embodiment of the present invention;

DETAILED DESCRIPTION OF THE PREFERRED EMBODIMENTS

Hereinafter, the embodiments of the present invention will be described with reference to the accompanying drawings

First Embodiment

Figure 1:
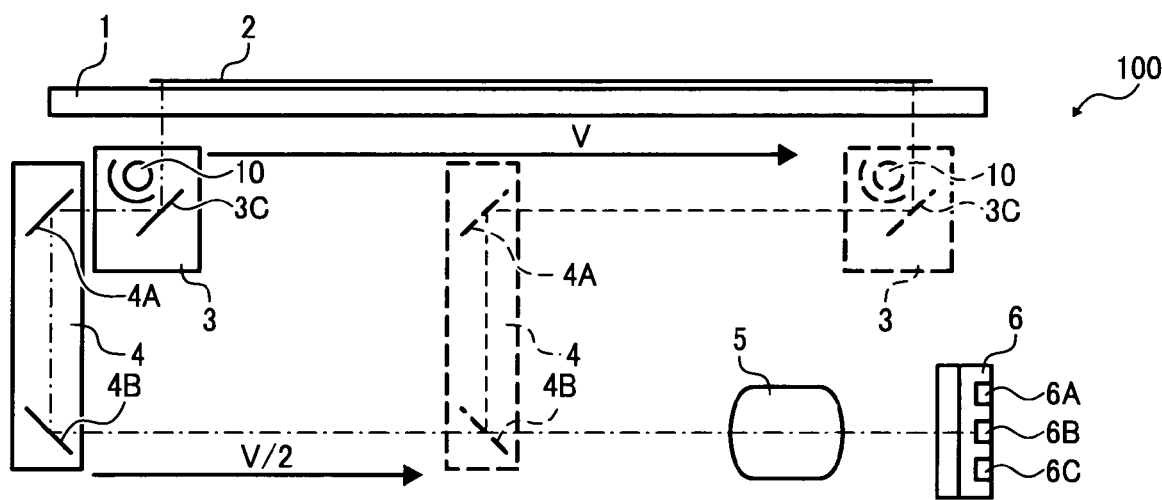
FIG. 1 is a schematic side view of an image read apparatus according to a first embodiment of the present invention.

FIG. 1 schematically shows a side view of an image read apparatus 100 according to the first embodiment. In the drawing, an original document 2 including an image to be read is disposed flatly on a contact glass 1 as a document platen. Beneath the contact glass 1, a later-described illumination unit 10 is provided to illuminate the underside of the original document 2 obliquely therefrom. In the illumination unit 10, a plurality of light source units 21 (not shown) with point light sources emitting light such as LEDS of minute area are disposed in a normal line direction of the drawing to illuminate the original document 2 in the normal line direction in slit-like manner.

Reflected light from illuminated portions of the original document 2 is reflected by a first mirror 3C provided in a first scanning body 3 and then reflected by a second mirror 4A and a third mirror 4B in a second scanning body 4 in sequence, thereby transmitting through a focus lens 5 to form a reduced image of the image of the original document on a imaging plane of a light receiving element 6. The first mirror 3C, second mirror 4A, and third mirror 4B constitute an optical reflection system.

The first scanning body 3 and second scanning body 4 are driven by a not-shown drive unit in directions of arrows (rightward in the drawing), respectively. The moving speed of the first scanning body 3 is referred to as V, and that of the second scanning body 4 as V/2. The first and second scanning bodies 3, 4 are displaced to positions indicated by broken lines in FIG. 1.

The illumination unit 10 moves integrally with the first scanning body 3 to illuminate and scan the entire original document 2 on the contact glass 1. Here, the ratio of moving speed between the first and second scanning bodies 3, 4 is V: V/2 and an optical path length from the document scanned to the focus lens 5 is set to be constant.

The light receiving element 6 is a 3-line CCD sensor of a single chip on which photoelectric conversion elements 6A, 6B, 6C having respective color separation filters of Red (R), Green (G), Blue (B) are arranged in 3 lines. The light receiving element 6 converts the image formed on the imaging plane into electric signals in accordance with the scanning of the original document 2. Accordingly, the original document 2 is subject to color separation in 3 original colors of red, green, blue and read by the light receiving element 6.

The image read apparatus 100 according to the present embodiment reads images in colors, and comprises color separation parts as RGB filters or the like in the light path from the illuminated portion of the original document to the light receiving element 6.

Figure 3:
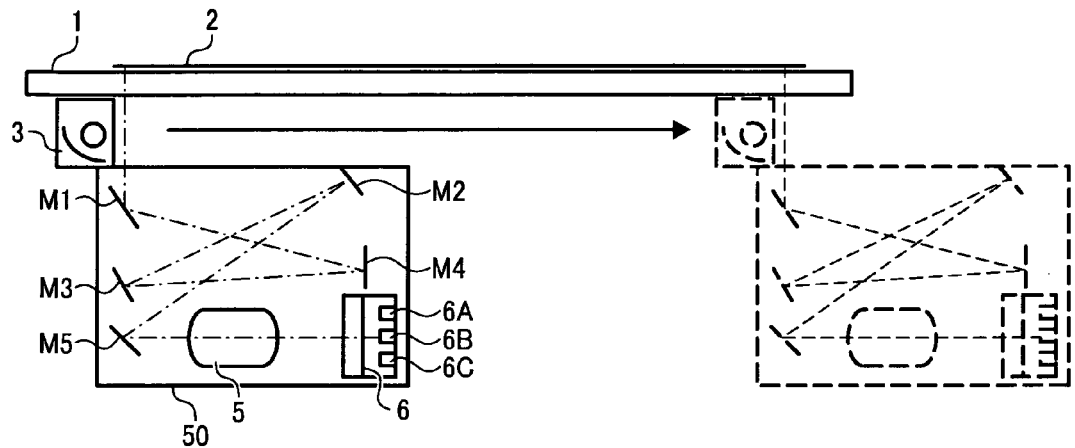
FIG. 3 is a schematic side view of another image read apparatus according to the first embodiment of the present invention.

Further, the image read apparatus 100 according to the present embodiment can be configured differently as shown in FIG. 3. That is, the original document 2 including an image to be read is disposed flatly on the contact glass 1 as a document platen. Beneath the contact glass 1, the illumination unit 10 is provided to illuminate the underside of the original document 2 in the normal line direction thereof in slit-like manner. Reflected light from an illuminated portion of the original document 2 is reflected by five mirrors M1 to M5, and then transmits through the focus lens 5 to form a reduced image of the image of the original document on the imaging plane of the light receiving element 6. The illumination unit 10, five mirrors, focus lens 5, and light receiving element 6 are integrally retained in a housing 50 which is driven by not-shown drive unit in a direction of an arrow. Note that the apparatus in FIG. 3 employs 5 mirrors; however, the number of mirrors is not limited thereto.

Further, in terms of the color separation, color separation prisms or filters can be selectively inserted between the focus lens 5 and the light receiving element 6 for the color separation in red, green, blue. Alternatively, light sources to emit light in red, green, blue can be turned on in sequence to illuminate the original document, or without provision of the color separation parts, the information of the document can be read in black and white.

Figure 2:
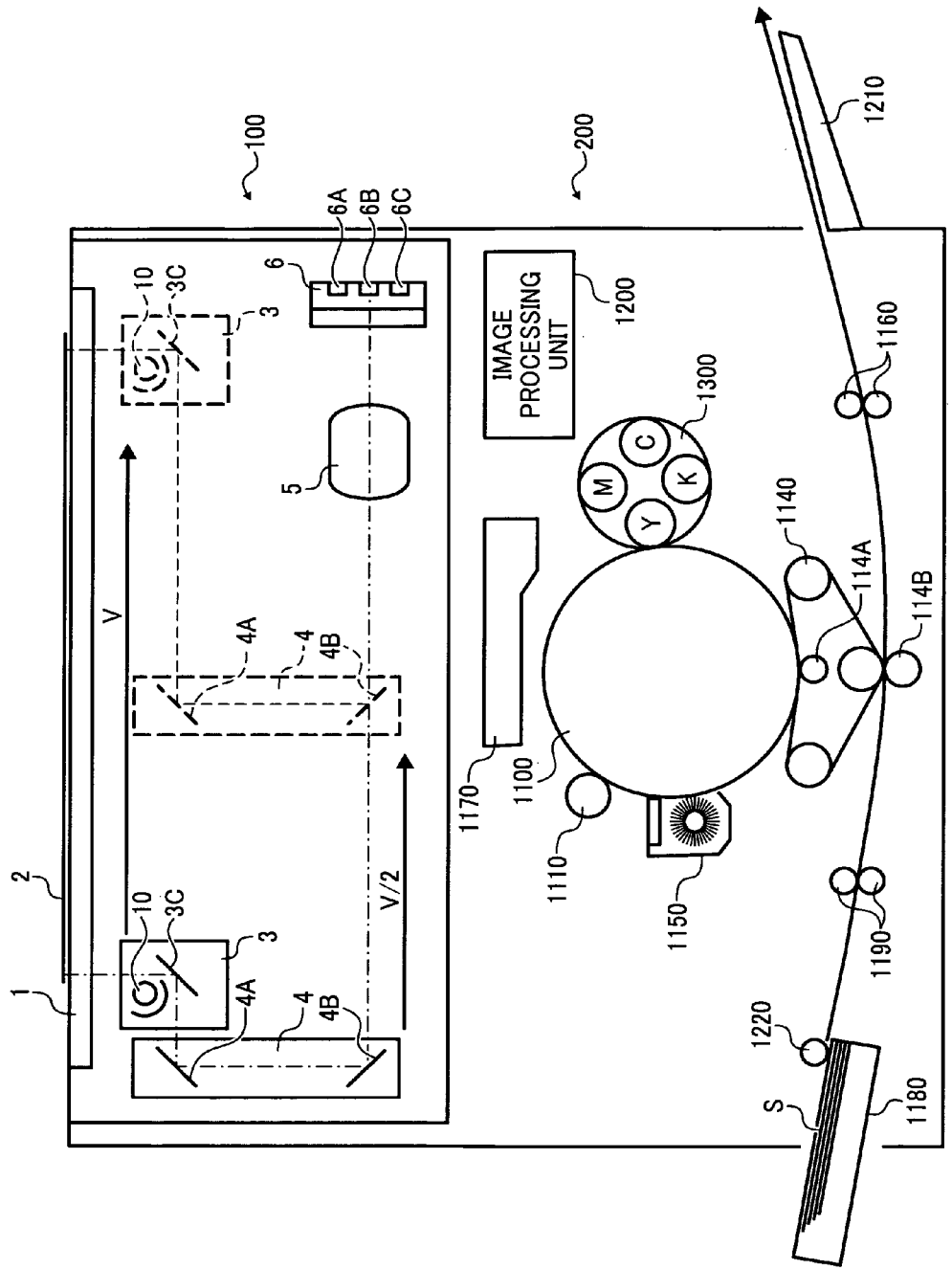
FIG. 2 is a schematic side view of an image formation apparatus according to the first embodiment of the present invention.

FIG. 2 is a side view of an image formation apparatus (copier) according to the present embodiment including the image read apparatus 100 in FIG. 1. The image formation apparatus comprises the image read apparatus 100 in the upper part and an image formation unit 200 in the lower part. The image read apparatus is configured similarly to that in FIG. 1. For the sake of simplicity, electric wire connection among the components is omitted therefrom.

The electric signals output from the light receiving element 6 of the image read apparatus 100 are transmitted to an image processing unit 1200 and converted thereby into electric signals for light beams which are to form onto a photoreceptor 1100 electrostatic latent images corresponding to yellow, magenta, cyan, black colors.

The image formation unit 200 includes a photoconductive photoreceptor 1100 of a cylindrical shape to support electrostatic latent images, a charge roller 1110 as an electric charger, a revolver-type development unit 1130, a transfer belt 1140, and a cleaning unit 1150 provided around the photoreceptor 1100. For the electric charger, a corona charger can be used in replace of the charge roller 1110.

An optical scan unit 1170 scans the photoreceptor 1100 between the charge roller 1110 and the development unit 1130 according to the electric signals for light beams output from the image processing unit 1200, thereby forming an electrostatic latent image on the surface of the photoreceptor 1100.

In the drawing, the numeric code 1160 represents a fuser, 1180 represents a paper cassette, 1190 represents a register roller pair, 1210 represents a tray, 1220 represents a paper feed roller, and S represents paper as a recording medium.

For image formation, the photoreceptor 1100 is rotated clockwise at constant velocity and charged uniformly by the charge roller 1110. The surface of the photoreceptor 1100 is exposed with the light beam from the optical scan unit 1170, thereby forming an electrostatic latent image thereon. The electrostatic latent image formed is a negative latent image and an image portion thereof is exposed.

The electrostatic latent images are formed on the surface of the photoreceptor 1100 along with the rotation of the photoreceptor 1100 in order of yellow, magenta, cyan, and black. The formed electrostatic latent images are inversely developed in sequence by a yellow toner part Y, a magenta toner part M, a cyan toner part C, and a black toner part B of the revolver-type development unit 1130 and visualized as toner images (positive images). The respective toner images are sequentially transferred onto the transfer belt 1140 by a transfer voltage apply roller 114A and superimposed thereon to be a color image.

The paper cassette 1180 containing the paper S is detachably provided in the image formation apparatus. When attached, a topmost sheet of paper S is extracted by the paper feed roller 1220 and captured at its end by the register roller pair 1190 which delivers the paper S to the transfer unit at a timing at which the color image on the transfer belt 1140 is moved to a transfer position. In the transfer unit the paper S is set to be overlapped with the color image on the transfer belt 1140, and the color image is electrostatically transferred onto the paper S by the action of the transfer roller 114B which presses the paper S onto the color image on the transfer belt 1140. Then, the paper S is delivered to the fuser to fuse the color image thereon, passes through a carrier path of a not-shown guiding member, and ejected onto a tray 1210 by a paper eject roller pair (not shown).

At every transfer of the toner image to the photoreceptor 1100, the surface thereof is cleaned by the cleaning unit 1150, to remove residual toner particles, paper powders or the like therefrom.

Note that the image formation unit 200 can be configured for a well-known monochromic (black color only or the like) image formation.

Next, the illumination unit 10 for use in the image read apparatus 100 will be described. In the drawings referred to in the following, solid arrows indicate a direction of light with highest intensity emitted from the light source unit 21.

Figure 23A:
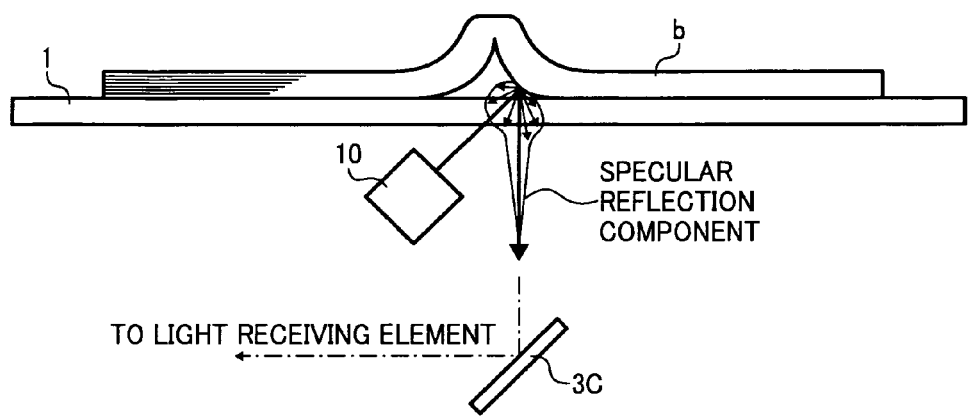
FIGS. 23A, 23B schematically show another example of configuration of the prior art illumination unit.
Figure 23B:
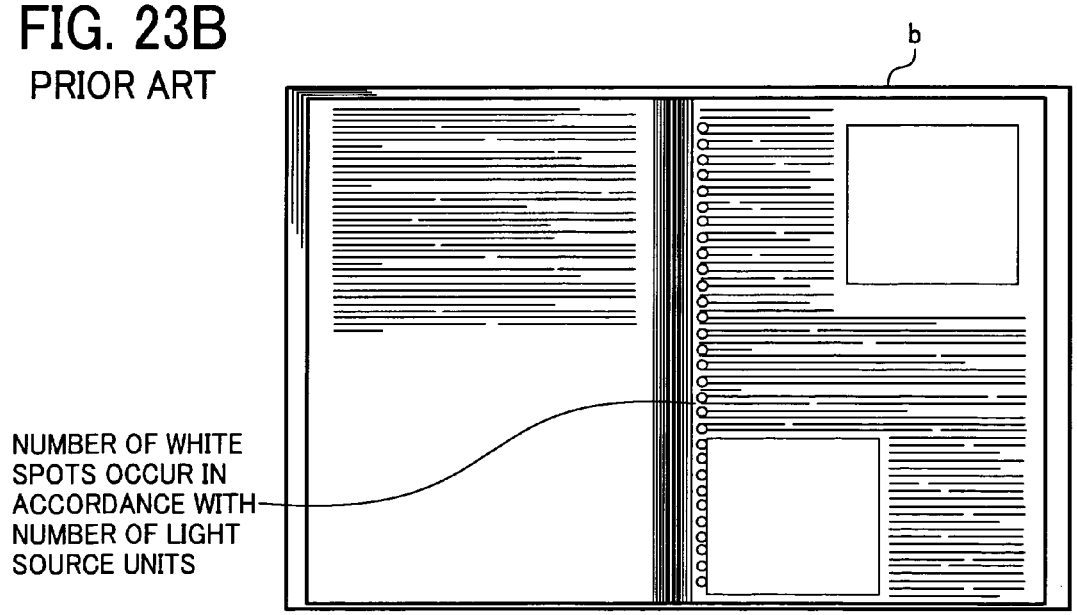
Figure 24:
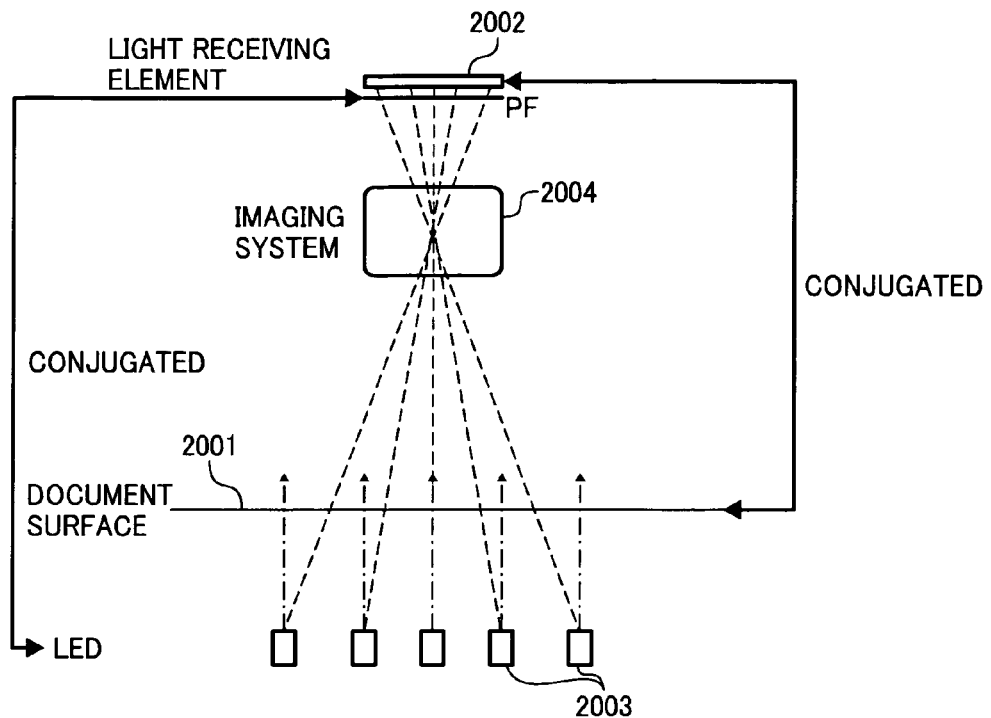
FIG. 24 is a view for describing a problem of the prior art illumination unit.

First, the illumination unit of the prior art image read apparatus will be described for comparison. FIG. 24 is a schematic view of an optical system of the prior art image read apparatus in which specular light reflection may be incident on the light receiving element as shown in FIG. 23A. In FIG. 24, a document surface 2001 is conjugated with a light receiving element 2002. LEDs 2003 positioned beneath the document surface 2001 are conjugated at a position PF between the light receiving element 2002 and an optical imaging system 2004 as a focus lens. In this state, halation occurs in the light receiving element 2002. Intensity of light emitted is the highest in directions perpendicular to an exit plane of light from each of the LEDs 2003 (hereinafter, to be referred to as directions of the LEDs 2003). Since the light from one of the LEDs 2003 positioned in the center of the illumination unit forms an image at the position PF, great halation occurs in the light receiving element 2002.

Figure 25:
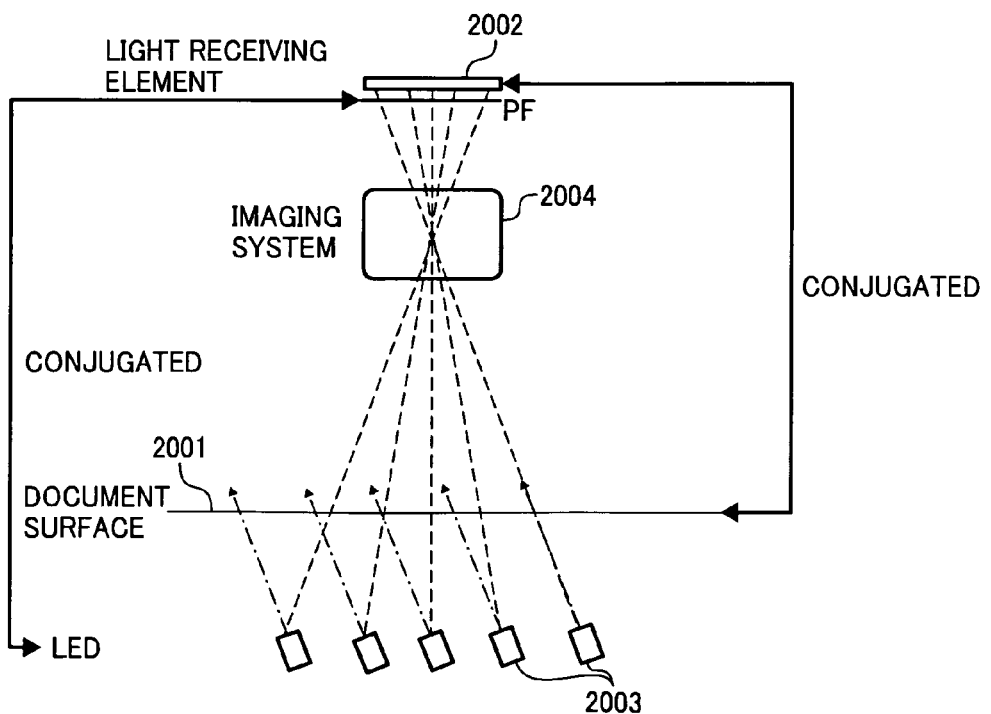
FIG. 25 is a view for describing another problem of the prior art illumination unit.

FIG. 25 shows another configuration of the illumination unit 10. As shown in the drawing, with the LEDs 2003 inclined in the same direction, the LEDs positioned at the periphery cause large halation. To prevent this from happening, inclining the direction of the LEDs 2003 even further, however, makes the illumination efficiency thereof deteriorate.

From the above, it can be concluded that at least the LED 2003 near the center of the illumination unit 10 are to be arranged in a direction not to perpendicular to the document surface 2001 (the arrangement direction of all the LEDs 2003) and all the LEDs 2003 including the one near the center of the illumination unit 10 do not have to face the same direction. This can prevent the light with high intensity from forming an image on the light receiving element 2002, and reducing halation therein. That is, adjusting incident angle of the illumination light to the document surface makes it possible to reduce the amount of specular light reflection from the document on the surface of the light receiving element, thereby reducing halation in the light receiving element 2002. Note that the LED 2003 near the center of the illumination unit 10 refers to one disposed closest thereto.

Next, the illumination unit 10 according to the present embodiment will be described.

Figure 4:
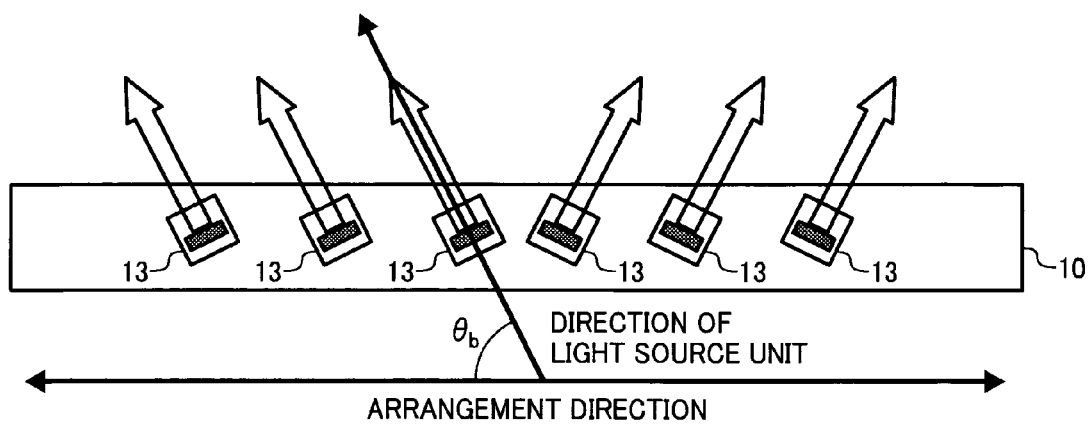
FIG. 4 is a schematic side view of an illumination unit according to the first embodiment of the present invention.

FIG. 4 shows the illumination unit 10 in which a plurality of light source units 13 each comprised of an LED are arranged for light emission. The illumination unit 10 is configured such that the emission directions of at least the light source units 13 near the center of the arranged light source units 13 are not perpendicular to the arrangement direction of all the light source units 13, and the emission directions of the plurality of light source units 13 are not the same. Note that the emission directions of the light source units 13 refer to directions perpendicular to the exit plane of light from the respective light source units 13. The arrangement direction of the light source units 13 refers to a direction in which the light source units 13 are arranged, as shown in FIG. 4.

With use of the illumination unit 10 as configured above, it is possible to reduce the halation due to the specular light reflection which enters the light receiving element 6 from the portion of the document not in contact with the document platen.

Figure 5:
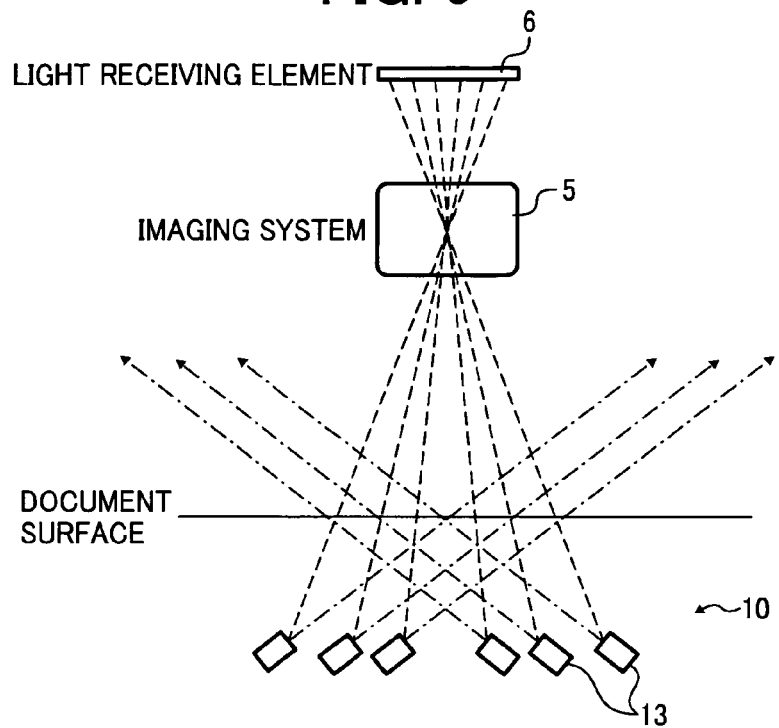
FIG. 5 schematically shows an example of configuration of the illumination unit according to the first embodiment of the present invention.
Figure 6:
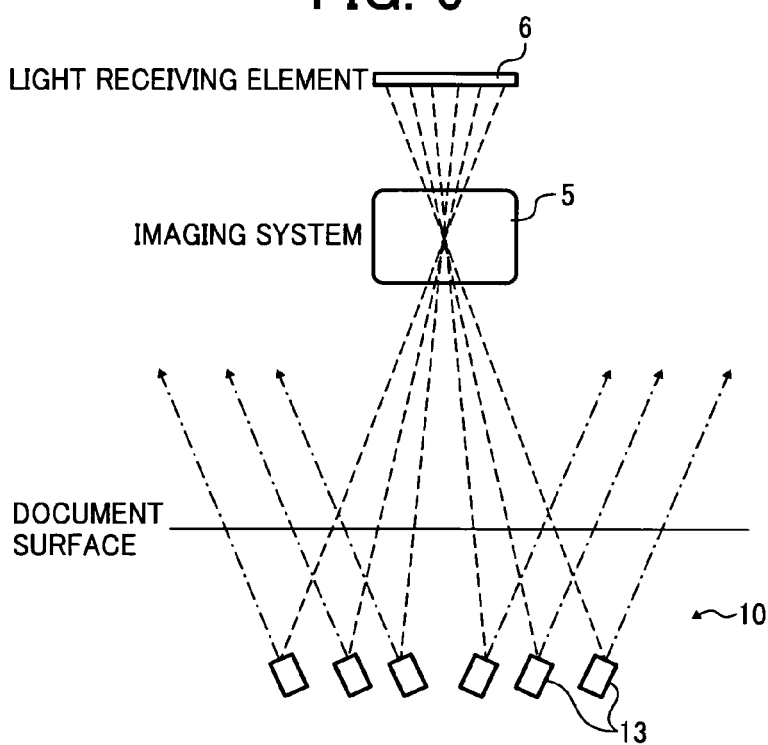
FIG. 6 schematically shows another example of configuration of the illumination unit according to the first embodiment of the present invention.

FIG. 5 shows another example of the illumination unit 10 in which each light source unit 13 is disposed facing the center of the illumination unit 10. FIG. 6 shows another example thereof in which each light source unit 13 is disposed facing outward of the illumination unit 10. In both of the illumination units 10 in FIGS. 5, 6, seen from the center thereof, the light source units 13 in the right side are inclined oppositely to those in the left side. With such a configuration, it is possible to reduce the halation in the light receiving element.

Figure 7:
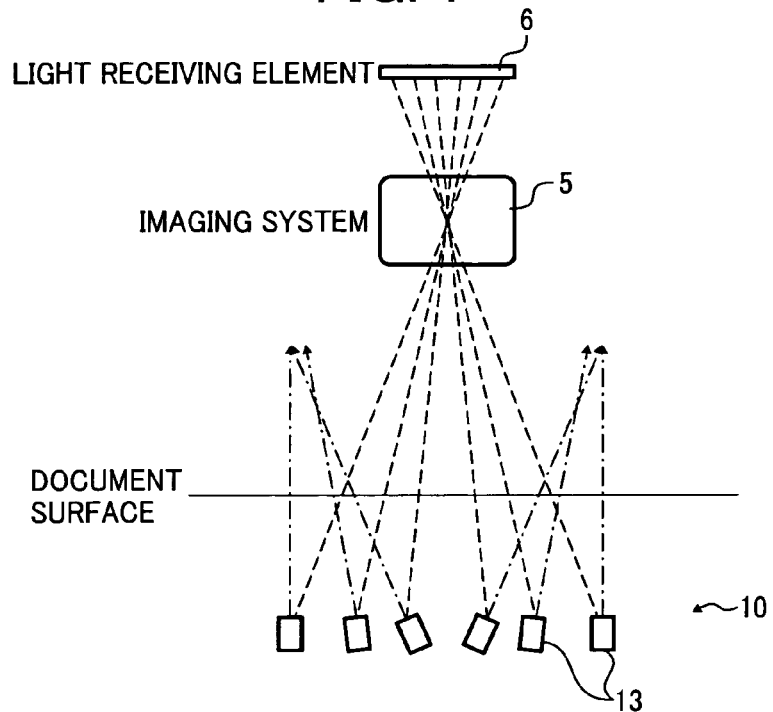
FIG. 7 schematically shows another example of configuration of the illumination unit according to the first embodiment of the present invention.
Figure 8:
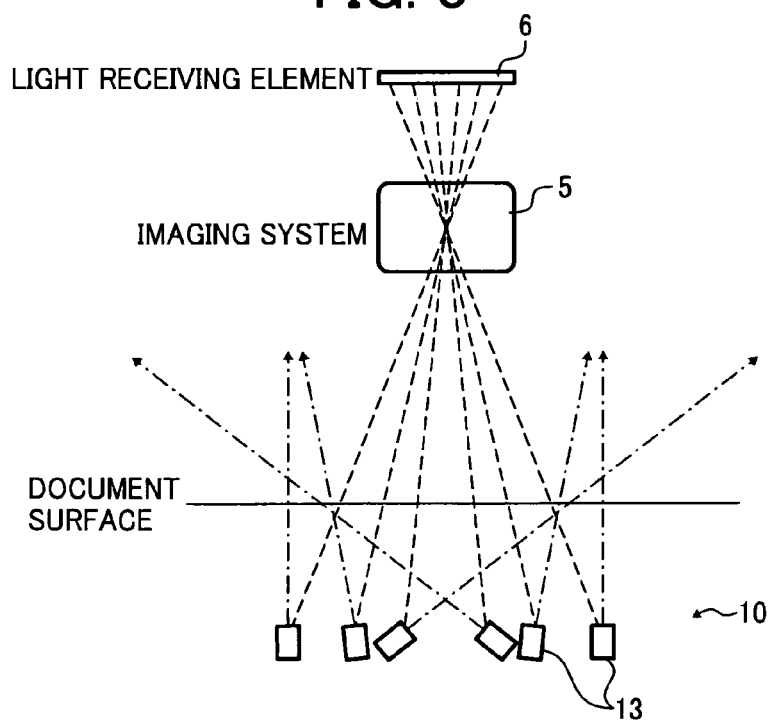
FIG. 8 schematically shows another example of configuration of the illumination unit according to the first embodiment of the present invention.

Further, FIGS. 7, 8 show other examples in which the light source units 13 in each of the right and left side of the illumination unit 10 are inclined differently from each other. This configuration enables not only the reduction of the halation but also compensation for the periphery brightness of the focus lens 5.

Figure 9A:
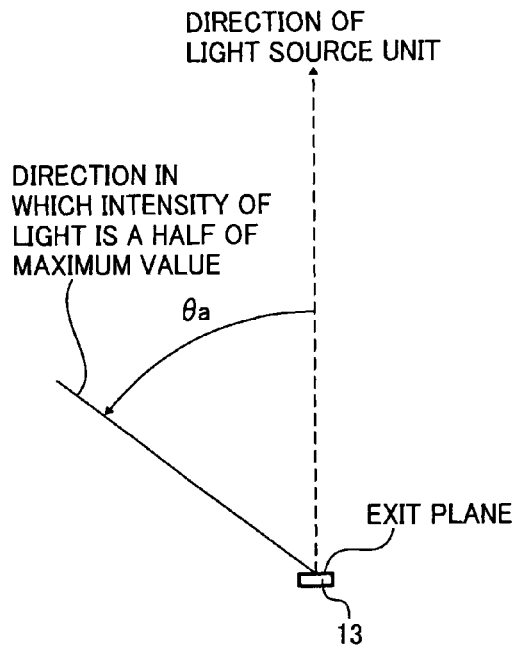
FIGS. 9A, 9B explain a half-value angle.
Figure 9B:
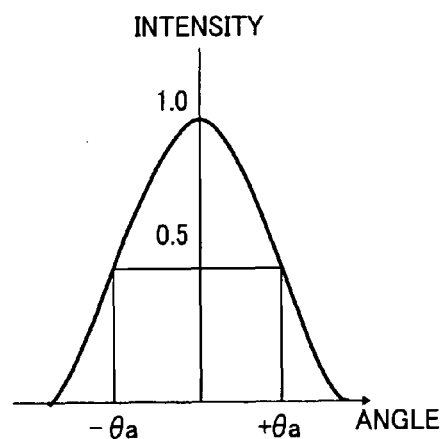

The light source units 13 near the center of the illumination unit 10 are preferably inclined at an angle represented by the following expression (1):

$$\theta b < 90° - 0.5 * \theta a$$

where $\theta a$ is a half-value angle [°] (a direction in which intensity of light emitted from the light source unit 13 is to be a half of the maximum value, as shown in FIG. 9), and $\theta b$ is an angle [°] between the emission direction of the light source unit 13 near the center of the illumination unit 10 and the arrangement direction of all the light source units 13 as shown in FIG. 4.

When the light source units 13 are a light source with Lambert's distribution, θa is 60° so that θb=60° is obtained from the expression (1). In this case, for the light source units 13 near the center of the illumination unit 10, the direction of light therefrom influencing the halation is shifted at 30 degrees or more from the perpendicularity at which the direction thereof is made with the arrangement direction of all the light source units 13. Assumed that intensity of the light with the highest intensity is to be 1, intensity of light incident on the light receiving element 2002 will be cos 30°≈0.87 or less, thereby reducing the amount of the halation at about 13%.

Moreover, to further reduce the halation, it is preferable that the light source units 13 are arranged to satisfy the following expression (2):

$$\theta b < 90° - \theta a$$

With the use of the light source with Lambert's distribution satisfying the above expression, it is possible to reduce the halation at about 50%.

Note that a light source having directivity can be used for the light source units 13. This results in further reducing the halation and increasing the degree of freedom at which the light source units 13 are laid out.

Figure 10:
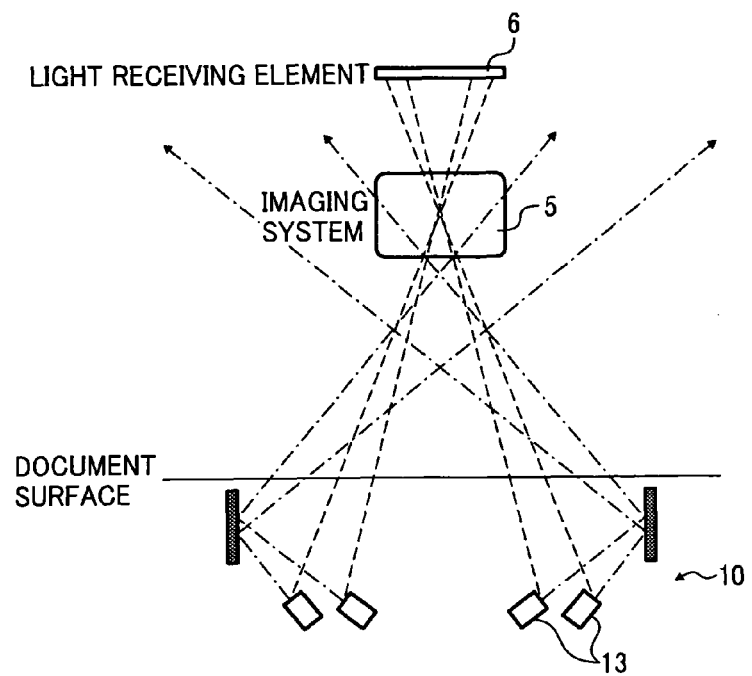
FIG. 10 schematically shows another example of configuration of the illumination unit according to the first embodiment of the present invention.

Furthermore, the illumination unit 10 can be configured that light emitted from the light source units 13 is reflected by a mirror or an optical guiding body as shown in FIG. 10 to utilize the light with high intensity as illumination light and improve the illumination efficiency. Also, the use of the mirror or the optical guiding body enables the direction of light to be largely inclined, achieving further reducing the halation. Here, the optical guiding body refers to an optical element to guide light from one end to the other by use of total reflection.

Furthermore, it is preferable that the light source units 13 are disposed not at the center of the illumination unit 10 but at positions other than the center thereof. This is because the light source unit 13 at the center of the illumination unit 10 need be disposed to be largely inclined, causing a problem that intensity of the light in the inclination direction is high. Therefore, the number of the light source units 13 is preferably an even number so that they can be arranged symmetrically relative to the center of the illumination unit 10.

Also, LEDs such as white LEDs are preferably used for the light source units 13. The LEDs have higher light usage efficiency than a tube lamp such as a xenon lamp and achieves low power consumption. Due to their high directivity, it is possible to further reduce the halation by disposing them to appropriately incline light adjacent to the light with highest intensity.

Further, by use of the white LEDs for the light source units 13, it is possible to read color information necessary to obtain image information in colors. Generally, in reading color information, color blurs or halation are likely to occur in reproduced images, which may cause great degradation in image quality. However, using the illumination unit 10, it is possible to reduce the halation with light in any wavelength.

Further, the light source units 13 can be ones emitting lights of different colors (corresponding to the colors of filters of the light receiving element, red (R), green (G), blue (B)). Use of such light source units makes it possible to improve light usage efficiency and read color image information. In this case, the LEDs are narrow in wavelength bandwidth, so that the colors of light do not have to be limited to three colors. With provision of additional light source units to emit light of different colors, it is also possible to improve color reproducibility of color information of the original document.

Second Embodiment

Hereinafter, the second embodiment of the present invention will be described. The present embodiment is directed to reduce the amount of specular light reflection from the document surface on the surface of the light receiving element and thereby suppress the halation thereon by adjusting the incident angle of the illumination light, as same as the first embodiment.

Figure 11:
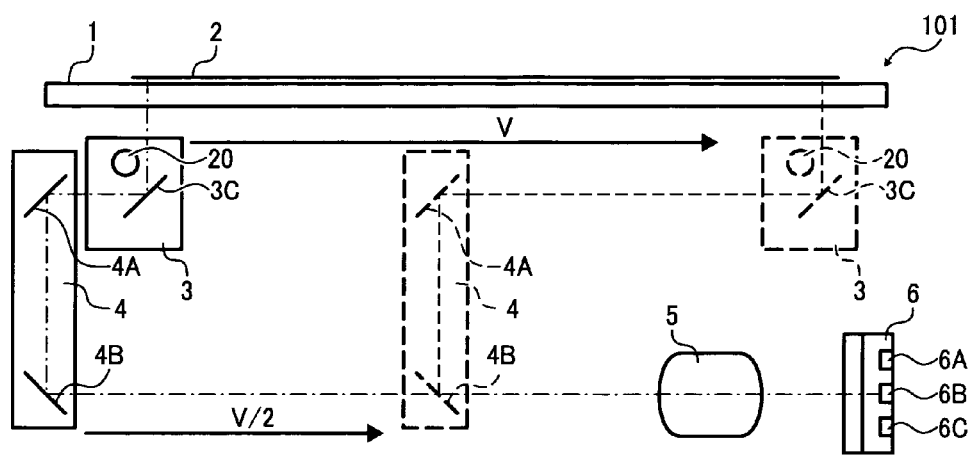
FIG. 11 is a schematic side view of an image read apparatus according to a second embodiment of the present invention.
Figure 13B:
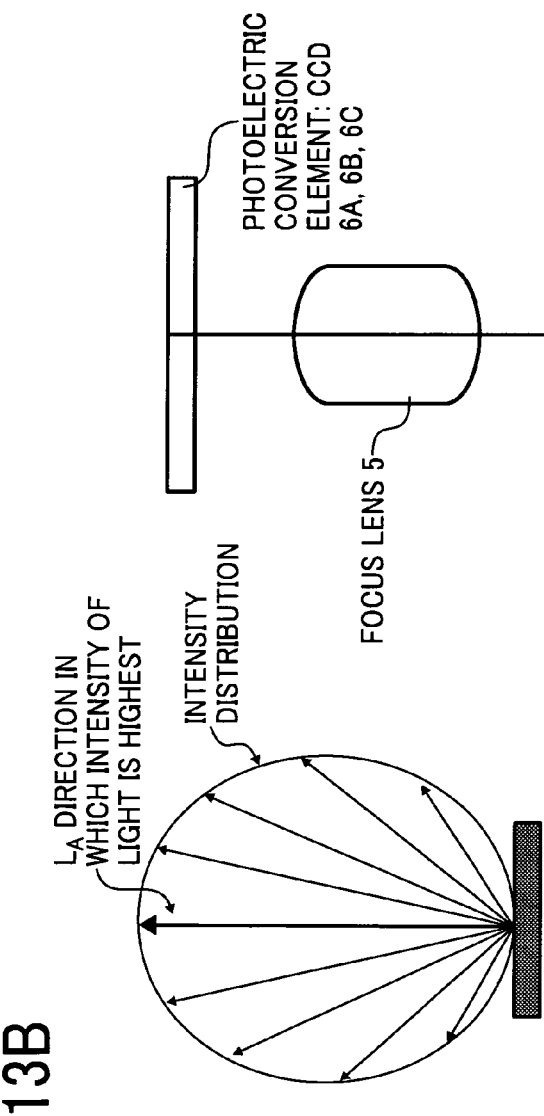
FIGS. 13A, 13B explain arrangement direction of light source units according to the second embodiment of the present invention.
Figure 13A:
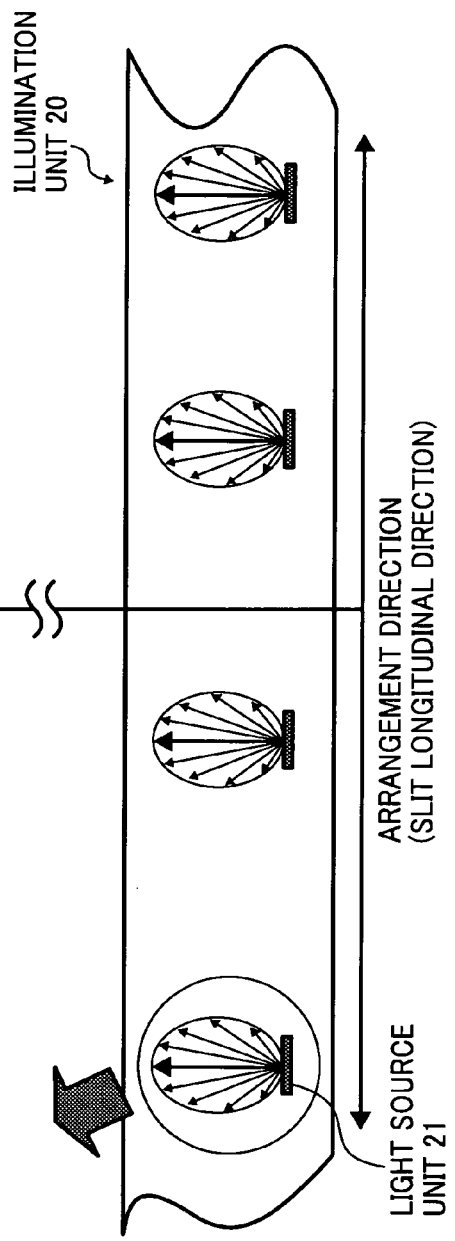

FIG. 11 is a schematic side view of an image read apparatus 101 according to the present embodiment. In the image read apparatus 101, an original document 2 having an image to be read is placed flatly on a contact glass 1 as a document platen. Beneath the contact glass 1, a later-described illumination unit 20 is provided to illuminate the underside of the original document 2 obliquely therefrom. In the illumination unit 20, a plurality of light source units 21 (FIG. 13) with point light sources emitting light such as LEDS of minute area are disposed in a normal line direction of the drawing to illuminate the original document 2 in the normal line direction in slit-like manner.

Reflected light from illuminated portions of the original document 2 is reflected by a first mirror 3C provided in a first scanning body 3 and then reflected by a second mirror 4A and a third mirror 4B in a second scanning body 4 in sequence, thereby transmitting through a focus lens 5 to form a reduced image of the image of the original document on a imaging plane of a light receiving element 6. The first mirror 3C, second mirror 4A, and third mirror 4B constitute an optical reflection system.

The first scanning body 3 and second scanning body 4 are driven by a not-shown drive unit in directions of arrows (rightward in the drawing), respectively. The moving speed of the first scanning body 3 is referred to as V, and that of the second scanning body 4 as V/2. The first and second scanning bodies 3, 4 are displaced to positions indicated by broken lines.

The illumination unit 20 moves integrally with the first scanning body 3 to illuminate and scan the entire original document 2 on the contact glass 1. Here, the ratio of moving speed between the first and second scanning bodies 3, 4 is V: V/2 and an optical path length from the document surface scanned to the focus lens 5 is set to be constant.

The light receiving element 6 is a 3-line CCD sensor of a single chip on which photoelectric conversion elements 6A, 6B, 6C having respective color separation filters of Red (R), Green (G), Blue (B) are arranged in 3 lines. The light receiving element 6 converts the image formed on the imaging plane into electric signals in accordance with the scanning of the original document 2. Accordingly, the original document 2 is subject to color separation in 3 original colors of red, green, blue and read by the light receiving element 6.

The image read apparatus 101 according to the present embodiment reads images in colors, and comprises color separation parts as RGB filters or the like in the optical path from the illuminated portion of the original document to the light receiving element 6.

Figure 12:
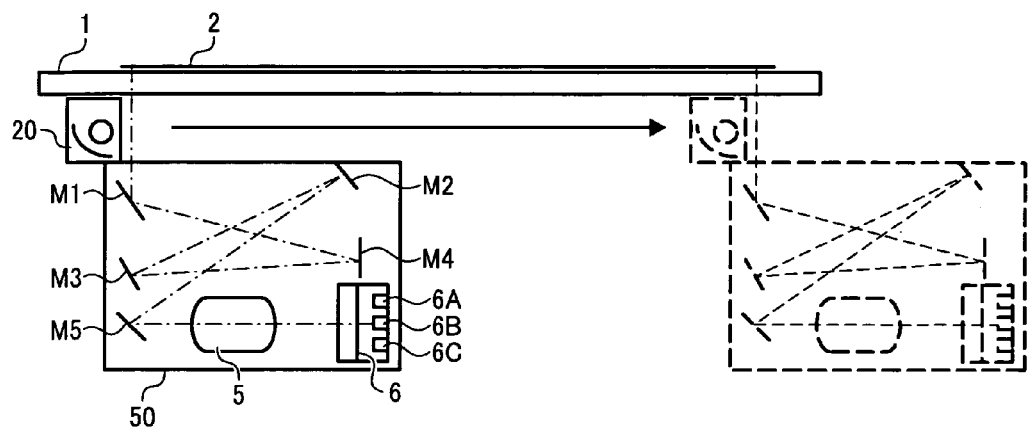
FIG. 12 is a schematic side view of another image read apparatus according to the second embodiment of the present invention.

Further, the image read apparatus 101 according to the present embodiment can be configured differently as shown in FIG. 12. That is, the original document 2 including an image to be read is disposed flatly on the contact glass 1 as a document platen. Beneath the contact glass 1, the illumination unit 10 is provided to illuminate the underside of the original document 2 in the normal line direction thereof in slit-like manner. Reflected light from an illuminated portion of the original document 2 is reflected by five mirrors M1 to M5, and then transmits through the focus lens 5 to form an image of the original document on the imaging plane of the light receiving element 6. The illumination unit 10, five mirrors, focus lens 5, and light receiving element 6 are integrally retained in a housing 50 which is driven by a not-shown drive unit in a direction of an arrow. Note that the apparatus in FIG. 12 employs 5 mirrors; however, the number of mirrors is not limited thereto.

Further, in terms of the color separation, color separation prisms or filters can be selectively inserted between the focus lens 5 and the light receiving element 6 for the color separation in red, green, blue. Alternatively, light sources in red, green, blue can be turned on in sequence to illuminate the original document, or without provision of the color separation sections, the information of the document can be read in black and white.

Next, the illumination unit 20 according to the second embodiment will be described.

In the illumination unit 20, the light source units 21 are arranged that a direction in which intensity of light from each light source unit 21 is to be highest is not perpendicular to the arrangement direction of all the light source units 21. It is preferable that among all of the light source units 21 in the illumination unit 20, at least ones near the center of the illumination unit 20 are arranged in the above-mentioned manner.

As described above, when the specular light reflection from the portion of the original document not in contact with the platen is incident on the light receiving element 6, the halation may occur thereon. In general, the intensity of light emitted from the light source unit 21 is highest in a direction perpendicular to an exit plane of the light source unit 21. In other words, the light source units around the center of the illumination unit, at which the focus lens 5 is positioned, are likely to cause the halation. The present embodiment is intended to suppress the halation by arranging at least the light source units near the center of the illumination unit 20 such that the specular light reflection from the portion of the document not in contact with the platen is not to be directly incident on the light receiving element 6 via the focus lens 5.

Specifically, in order to make the direction of the light with highest intensity at a non-perpendicular angle with the arrangement direction of all the light source units 21, each light source unit is configured to include a reflection part 22 ahead of a light source body 21a emitting light. The reflection part 22 reflects a part of the light from the light source body 21a including light LA with the highest intensity to incline it at a predetermined angle relative to a direction perpendicular to the exit plane of the light source body 21a.

FIGS. 14A to 14C show examples of configuration of the light source unit 21 according to the present embodiment. The reflection part 22 is disposed ahead of the light source body 21a to reflect a part of the light from the light source body 21a including light LA with the highest intensity to incline it. Disposing the reflection part 22 adjacent to the exit plane of the light source body 21a allows the size of the reflection part 22 to be decreased.

FIG. 14A shows an example in which the reflection part 22 reflects the light in substantially all of the right side of the arrangement direction of the light source unit 21. The light reflected by the reflection part 22 includes the light LA with the highest intensity among the light emitted from the light source unit body 21a.

FIG. 14B shows another example in which the reflection part 22 reflects light in almost a half of the half side of the arrangement direction of the light source unit 21. The light reflected by the reflection part 22 includes the light LA with the highest intensity among the light emitted from the light source unit body 21a.

Similarly to FIG. 14A, FIG. 14C shows an example in which the reflection part 22 reflects light in all of the half side of the arrangement direction of the light source unit 21. The light reflected by the reflection part 22 includes the light LA with the highest intensity among the light emitted from the light source unit body 21a. In FIG. 14C, the reflection part 22 is configured to have a curvature (convex) so that it reflects light in the same direction. Also, the curvature of the reflection part 22 can be opposite (concave) to that in FIG. 14C to converge reflected light, or the surface of the reflection part 22 can be formed in non-spherical shape or can be free-form surface to obtain a desired reflectivity.

Here, the light source unit 21 near the center of the illumination unit 20 is preferably arranged so as to satisfy the following expression (3):

$$\theta b < 90° - 0.5 * \theta a$$

where $\theta a$ is the above-described half-value angle [°], and $\theta b$ is an angle [°] (FIG. 15) between a direction in which the light with highest intensity among the light emitted from the light source body 21a is reflected by the reflection part 22 and the arrangement direction of all the light source units 13.

For example, at the half-value angle $\theta a$ being 50° and $\theta b$ being 65° or less, the intensity of light directly incident on the light receiving element 6 can be reduced to half or less of the maximum value, thereby reducing the halation thereon.

When the light source units 21 are light sources with Lambert's distribution, $\theta a$ is 60° so that $\theta b=60°$ is obtained from the expression (3). In this case, for the light source units 21 near the center of the illumination unit 20, the direction of light therefrom influencing the halation is shifted at 30 degrees or more from the perpendicularity at which the direction thereof is made with the arrangement direction of all the light source units 21. Assumed that intensity of the light with the highest intensity is to be 1, intensity of light incident on the light receiving element 6 will be cos 30°≈0.87 or less, thereby reducing the amount of the halation at about 13%.

The light source units 21 can be ones with directivity. This results in further reducing the halation and increasing the degree of freedom at which the light source units 21 are laid out.

Further, it is preferable that the number of the light source unit 21 is to be an even number in the illumination unit 20. This is because the illumination unit 20 needs to illuminate the original document evenly so that the light source units 21 have to be symmetrically arranged relative to the center of the illumination unit 20. With an odd number of the light source units, to symmetrically arrange all of the light source units 21, a single light source unit 21 need be disposed at the center of the illumination unit 20 at which the focus lens 5 is positioned, therefore, the halation is likely to occur. Accordingly, with provision of the even number of the light source units 21, it is possible to avoid the disposition of the light source unit 21 around the center of the illumination unit 20 and occurrence of the halation.

In addition, the LEDs such as white LEDs are preferably used for the light source units. The LEDs have higher light usage efficiency than tube lamps such as a xenon lamp and achieves low power consumption. Due to their high directivity, it is possible to further reduce the halation by disposing them to appropriately incline light adjacent to the light with highest intensity.

Moreover, by use of the white LEDs for the light source units 21, it is possible to read color information necessary to obtain image information in colors. Generally, in reading color information, color blurs or halation are likely to occur in reproduced images, which may cause great degradation in image quality. However, using the illumination unit 20, it is possible to reduce the halation with light in any wavelength.

Further, the light source units 21 can be monochromic light sources emitting lights of different colors (corresponding to the colors of filters of the light receiving element, red (R), green (G), blue (B)). By arranging such light source units, it is possible to synthesize illumination lights of the plurality of colors on the original document for white color illumination. In this case, it can also be configured to read the document by the light source units of the plurality of colors in sequence.

Further, the light source units 21 can be ones emitting lights of different colors (corresponding to the colors of filters of the light receiving element, red (R), green (G), blue (B)). Use of such light source units makes it possible to improve light usage efficiency and read color image information. In this case, the LEDs are narrow in wavelength bandwidth, therefore, the colors of light do not have to be limited to three colors. With provision of additional light source units to emit light of different colors, it is also made possible to improve color reproducibility of color information of the original document.

Hereinafter, specific configurations of the illumination unit 20 according to the present embodiment are described with reference to FIGS. 16 to 19.

Figure 16:
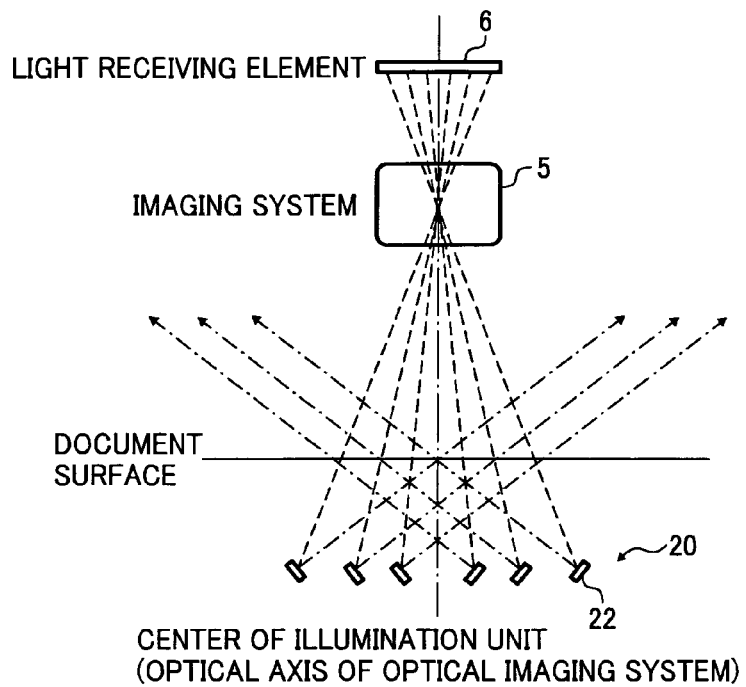
FIG. 16 schematically shows an example of configuration of the illumination unit according to the second embodiment of the present invention.
Figure 17:
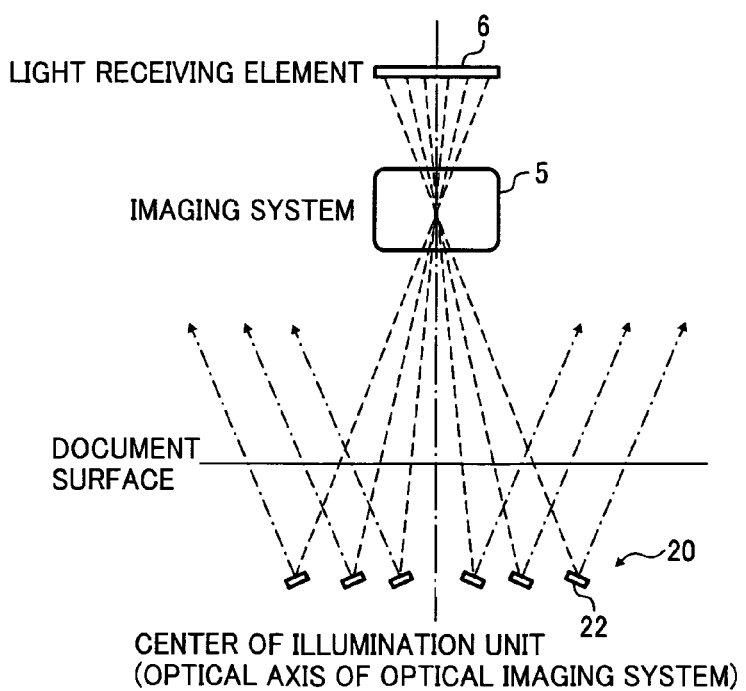
FIG. 17 schematically shows another example of configuration of the illumination unit according to the second embodiment of the present invention.

In the illumination unit 20 in FIG. 16, reflection parts 22 of each light source unit 21 is arranged to face the center of the illumination unit 20, while that in FIG. 17, they arranged to face the outside of the illumination unit 20. Both of the illumination units 20 are configured that the reflection parts 22 on the right side and left side relative to the center of the illumination unit 20 are inclined in opposite directions. With such configuration it is possible to reduce the halation.

Figure 18:
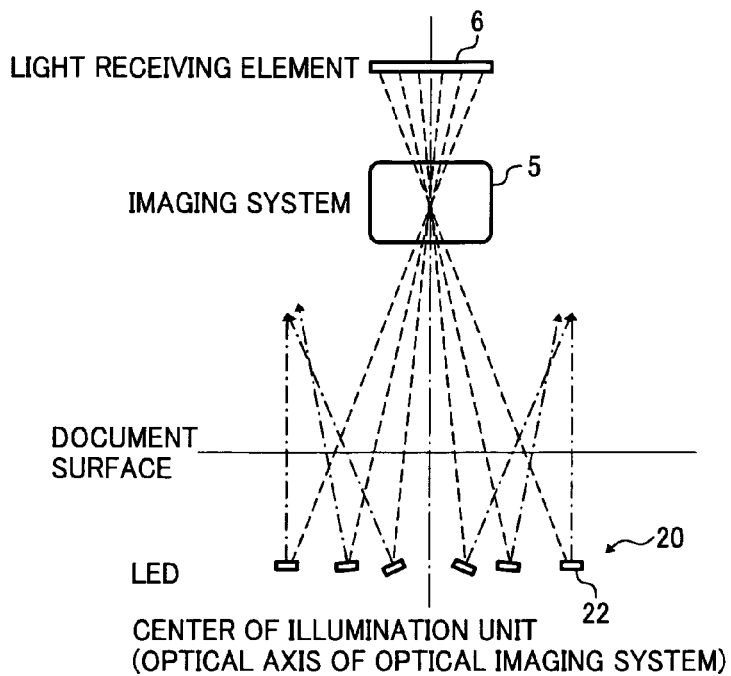
FIG. 18 schematically shows another example of configuration of the illumination unit according to the second embodiment of the present invention.

Alternatively, as shown in FIG. 18, the illumination unit 20 can be configured that the respective reflection parts 22 on the right and left sides are inclined differently from each other. With such configuration, it is also possible to reduce the halation as well as to compensate for the periphery brightness of the optical imaging system and obtain uniform illumination light.

Figure 19:
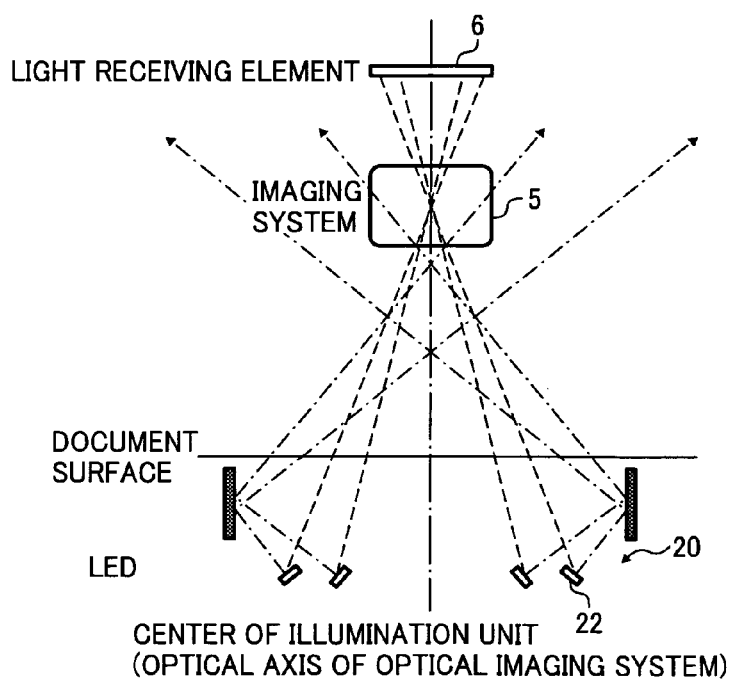
FIG. 19 schematically shows another example of configuration of the illumination unit according to the second embodiment of the present invention.

In FIG. 19, the illumination unit is configured that light from the light source units 21 is reflect by mirrors or optical guiding bodies. This allows light with high intensity to be used as illumination light, thereby improving illumination efficiency. Further, the use of the mirrors or optical guiding bodies makes it possible to largely incline the directions of lights to further reduce the halation. Here, the optical guiding bodies refer to an optical element guiding light from one end to the other end by use of total reflection.

As described above, by the use of the illumination unit 20 according to the present embodiment, it is possible to provide the image read apparatus 101 with good reading quality and occurrence of less halation. Also, it is possible to suppress the halation to a negligible level for actual use even in the image read apparatus 101 having an optical imaging system for forming reduced images in which the halation often occurs.

Third Embodiment

Hereinafter, the third embodiment of the present invention will be described. The present embodiment is the same as the first embodiment except that the illumination unit 10 is replaced by an illumination unit 30. Therefore, the description will be made only on the illumination unit 30. The present embodiment is directed to reduce the halation on the light receiving element by adjusting divergence of illumination light relative to the surface of the document to be read to reduce specular light reflection therefrom on the light receiving element 2002.

Figure 20A:
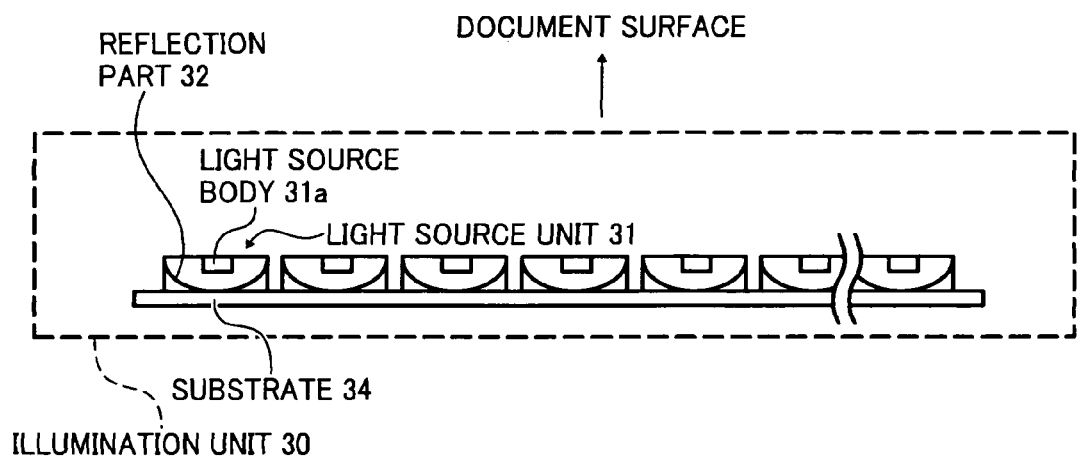
FIGS. 20A, 20B are cross sectional side views of an illumination unit according to a third embodiment of the present invention.

FIG. 20A shows the illumination unit 30 that includes a plurality of light source units 31 arranged in a line on a single substrate 34. The light source units 31 are of reflective type each to emit light from a light source unit body 31a and reflect the light by a reflection part 32, thereby illuminating light on a surface of the document, as shown in the drawing. The present embodiment uses the LED for the light source body 31a. In the illumination unit 30 the reflection part 32 has a paraboloidal surface and the light source body 31a is placed at a focal position of the reflection part 32, to allow light from the focal point of the paraboloidal surface to emit in substantially parallel to a direction of the document, that is, substantially perpendicular to the surface of the document. Thereby, it is made possible to illuminate the surface of the document even with Lambert diffusion light from the light source unit 31a of a very small size in a substantially perpendicular direction as well as to efficiently use the light from the light source unit 31a as the illumination light.

Figure 22:
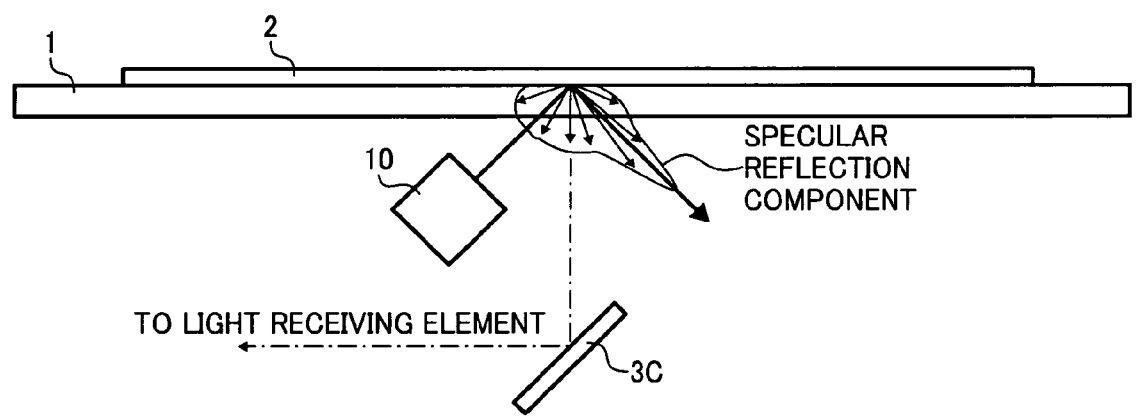
FIG. 22 schematically shows an example of configuration of the prior art illumination unit.

When the image read apparatus is one having an optical system for reducing image data of the document, it is necessary not to gather specular light reflections on the light receiving element in order to avoid the occurrence of halation as shown in FIG. 22.

In the following, conditions for prevention of the specular light reflection from being gathered on the light receiving element will be described with reference to FIG. 21.

Figure 21:
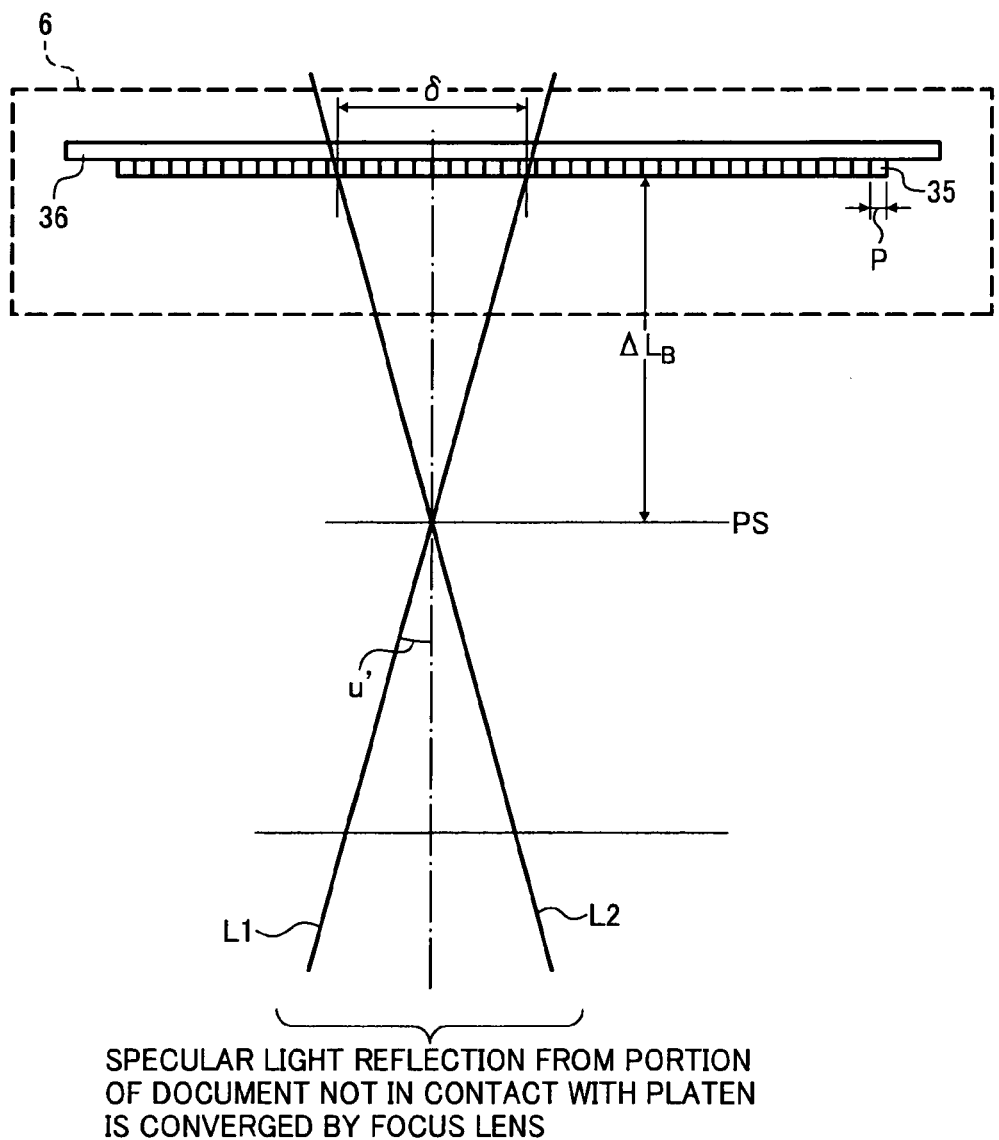
FIG. 21 shows a relationship between a light receiving element according to the third embodiment of the present invention and a flux of specular light reflection.

FIG. 21 shows the light receiving element 6 having a plurality of CCD pixels 35 arranged on a substrate 36. In the drawing convergent lights L1, L2, which represent specular light reflections from the book b in FIG. 22, are gathered on a not-shown focus lens. When the convergent lights L1, L2 are gathered on the CCD pixels 35, the light incident thereon is to be too high in intensity, causing the above-described halation.

The convergent lights L1, L2 gathered on the CCD pixels 35 signifies a state that the CCD pixels 35 and the light source units 31 are in a conjugation relationship by the action of the focus lens when the light source units 31 are very close to the surface of the document 2. To prevent the convergent lights L1, L2 from being gathered on the CCD pixels 35, the light source units 31 have to be placed at a position far from the surface of the document so that the convergent lights L1, L2 form an image at a position before the light receiving element 6.

Here, to position the light source units 31 far from the document surface, the illumination light to the document 2 is set to be a parallel spread light. The light source units 31 can be considered in an infinite distance from the document 2 when the illumination light is set to be the parallel light. Because of this, the convergent lights L1, L2 are gathered at the focal position of the focus lens, and diverged and blur on the light receiving element 6 (CCD pixels 35). Accordingly, it is possible to weaken the intensity of light incident on each CCD pixel 35, thereby preventing the halation thereon.

In FIG. 21, ΔLB represents a distance between the light receiving element 6 and the focal position PS of the convergent lights L1, L2 when the light source units 31 are placed with an arbitrary distance from the document, and δ represents a divergence of the convergent lights L1, L2 on the light receiving element 6 when the focal position PS=ΔLB.

The relationship between ΔLB and δ is expressed by the following expression (4):

$$\text{SIN}(u') = NA_{img} = \frac{1}{2(1 + |m|)} F$$

-continued $$\delta = 2\Delta L_B \cdot NA_{img}$$

$$\Delta L_B = \delta F(1 + |m|)$$

where f is a focal length of the focus lens, F is a f-number, and m is a magnification of the optical imaging system.

Further, a relationship between magnification of the optical system m' and δ is expressed by the following expression (5):

$$|m'| = |m| - (1 + |m|)\frac{\delta F}{f}$$

where m' is a magnification of the optical imaging system to allow the convergent lights L1, L2 to be gathered at a position shifted by ΔLB from the light receiving element 6.

Using m' in the expression (4), a distance ΔLA between the surface of the document and the light source units 31 is expressed by the following expression (6):

$$\Delta L_A = \frac{|m| - |m'|}{|mm'|} f$$

$$= \frac{(1 + |m|)\delta F f}{m^2 f - (1 + |m|)|m|\delta F}$$

Thus, when the document is illuminated by the light source units 31 distanced from the document surface by ΔLA obtained by the expression (6), the specular light reflection therefrom is widely spread with δ on the light receiving element 6. Assuming that the divergence δ is six times larger than pixel size P in the arrangement direction of the CCD pixels 35, for example, the ratio of sizes thereof is to be 36 to 1 so that the ratio of amounts of light is to be 1/36. The specular light reflection can be reduced to about 3% or less. Accordingly, it is possible to reduce the occurrence of halation and read images of the document 2 with good quality.

The relationship between δ and the pixel size P is expressed by the following expression (7):

$$\delta = 6P$$

From the relationship in the expression (7), ΔLA is expressed by the following expression (8):

$$\Delta L_A = \frac{6(1 + |m|)PFf}{m^2 f - 6(1 + |m|)|m|PF}$$

Positioning the light source units 31 to satisfy the expression (8) enables the specular light reflection to be so diverged on the light receiving element 6 that it will not affect the image reading on the document.

In the following, Table 1 shows the focal length f, f-number F, and magnification m of the focus lens, and ΔLB, m', and ΔLA calculated using the pixel size P.

TABLE 1

| | F | | | |
|---|---|---|---|---|
| | 4.2 | 5.6 | 5.0 | 6.0 |
| f [mm] | 45 | 45 | 18 | 18 |
| P [mm] | 0.0047 | 0.0047 | 0.00525 | 0.00525 |

TABLE 1-continued

| | F | | | |
|---|---|---|---|---|
| | 4.2 | 5.6 | 5.0 | 6.0 |
| δ [mm] | 0.0282 | 0.0282 | 0.0315 | 0.0315 |
| m | 0.11102 | 0.11102 | 0.12400 | 0.12400 |
| ΔL_B [mm] | 0.132 | 0.175 | 0.177 | 0.212 |
| m' | 0.10810 | 0.10712 | 0.11417 | 0.11220 |
| ΔL_A [mm] | 10.965 | 14.753 | 12.505 | 15.269 |

Comparing F=5.0 with F=5.6 in Table 1, it is obvious that the smaller the value of f-number of the focus lens, the smaller the focal depth of the optical imaging system so that the required distance ΔLA is decreased. In contrast, from comparison of F=5.0 and F=5.6, when f-numbers are close values, the longer the focal length of the focus lens, the larger the focal depth of the optical imaging system so that the required distance ΔLA is increased. Further, from comparison of F=5.6 and F=6.0, it can be seen that the distance ΔLA is also in proportion to the magnification m of the optical imaging system. Therefore, the smaller the magnification m, the smaller the focal depth so that the required distance ΔLA is decreased.

According to Table 1, with ΔLA set to 15 mm or more, the convergent lights L1, L2 of the specular light reflection from the document surface can be diverged on the light receiving element 6.

Note that increasing the distance ΔLA is considered as equivalent to decreasing diffusion angle of light emitted from the light source units 31 of the illumination unit 30.

Figure 20B:
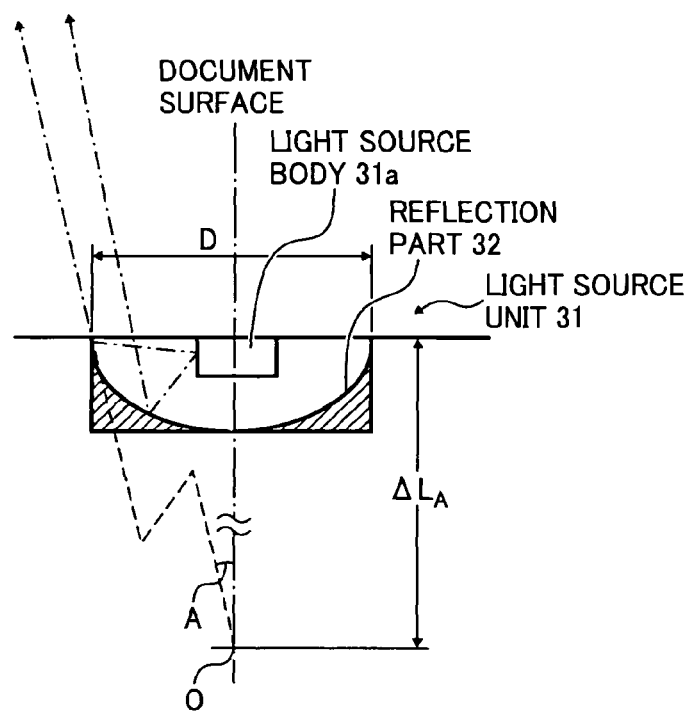

FIG. 20B shows an enlarged view of the light source unit 31. Light emitted from the exit plane of the light source unit body 31a at an arbitrary angle is considered as equivalent to light emitted from a pseudo-light emission position O. The distance ΔLA from the exit plane of the light source unit 31 to the pseudo-light emission position O is expressed by the following expression (9):

$$TAN(A) = \frac{D}{2\Delta L_A}$$

$$A \approx \frac{D}{2\Delta L_A}$$

where D is a length of the exit plane in the arrangement direction of the light source units 31.

When the distance ΔLA is 15 mm or more as in the following expression (10), the expression (11) holds true as follows:

$$\Delta LA \geq 15 \quad (10)$$

$$\theta_a \leq \frac{D}{30} \quad (11)$$

where θa [rad] is a half-value angle of intensity of light emitted from the light source unit 31 and D is a length [mm] of the exit plane in the arrangement direction of the light source units 31.

Accordingly, by use of the illumination unit 30 satisfying the expression (11), the convergent lights L1, L2 of the specular light reflection from the document surface can be diverged on the light receiving element 6.

Note that the half-value angle θa refers to a direction in which the intensity of light from the light source unit 31 is to be a half of the highest value and to an angle from the perpendicular direction of the exit plane of the light source unit 31. For example, when the length D of the exit plane is 7 mm, the reflection part 32 is formed to make the half-value angle θa be 0.23 rad (13°) or less according to the expression (11). Thereby, the convergent lights L1, L2 of the specular light reflection from the document surface can be diverged on the light receiving element 6.

Providing the reflection part 32 with a diffusive plane is advantageously effective to reduce the intensity of specular light reflection since it results in emission of irregular lights from the exit plane of the light source unit 31.

Also, provision of a phosphor between the light source unit 31*a* and the reflection part 32 in the light source unit 31 makes it possible to easily obtain white color light and to read documents in colors.

Further, the light source units 31 can be monochromic light sources emitting lights of different colors (corresponding to the colors of filters of the light receiving element, red (R), green (G), blue (B)). By arranging such light source units, it is possible to synthesize illumination lights of the plurality of colors on the original document for white color illumination. In this case, it can also be configured to read the document by the light source units 31 of the plurality of colors in sequence.

Note that when the illumination unit 30 has to satisfy a higher requirement for the halation reduction, it is also possible to further reduce the halation by setting ΔLA at a larger value by the expressions (7) to (11) so that the incident angle of light on the document surface gets closer to perpendicular and by increasing the divergence 6 of the convergent lights on the light receiving element 6.

It should be understood that the image read apparatus according to the present invention is not limited to one with the contact glass 1 as a document platen. Similar effects will be attainable when the present invention is applicable to an image read apparatus in which the first and second scanning bodies 3, 4 are fixed at an arbitrary position, to read images of documents while feeding them.

According to one preferable embodiment of the present invention, the illumination unit for use in an image read apparatus is provided which illuminates a surface of an original document with illumination light, reads an image of the original document by a light receiving element, and adjusts an amount of specular light reflection from the surface of the original document on a light receiving plane of the light receiving element by adjusting at least one of an incident angle of the illumination light and a divergence thereof.

According to another preferable embodiment of the present invention, the illumination unit is configured to comprise a plurality of light source units arranged in a direction and emitting light as the illumination light. The light source units are arranged so that a direction in which intensity of light emitted from at least one of the light source units is to be highest makes a non-perpendicular angle with the direction of arrangement of the light source units, the at least one of the light source units being closest to a center of the arrangement.

In the above illumination unit, it is possible to reduce the amount of specular light reflection incident on the light receiving element from the surface of the original document by adjusting the angle of illumination light emitted from the light source unit. This makes it possible to reduce the halation occurring in the image reading and realize good image reading.

According to another preferable embodiment of the present invention, in the illumination unit each of the light source units is configured to comprise a light source body emitting the light and a reflection part reflecting all or a part of the light emitted from the light source body to change a direction thereof, the part of the light including light with highest intensity. With such a configuration, it is possible to appropriately set the angle of the light (illumination light) emitted from the light source unit by adjusting the reflection part.

According to another preferable embodiment of the present invention, in the illumination unit the plurality of light source units are arranged so as to satisfy the following expression:

$$\theta b < 90° - 0.5 * \theta a$$

where θa is a half-value angle of intensity of the light emitted from the light source unit and θb is an angle between a direction in which intensity of light emitted from the at least one of the light source units is to be highest and the direction of arrangement.

With such a configuration, it is possible to reduce the amount of specular light reflection incident on the light receiving element from the surface of the original document by adjusting the angle of illumination light emitted from the light source unit. This makes it possible to reduce the halation occurring in the image reading, and realize good image reading and efficient illumination.

According to another preferable embodiment of the present invention, the illumination unit is configured to comprise one of a mirror and an optical guiding body reflecting the light emitted from the light source units. In such illumination unit, the directions of light emitted from the light source units can be freely set, thereby improving illumination efficiency and energy efficiency. Also, the increase in the degree of freedom for setting the directions enables increase in the flexibility of how the components of the illumination unit are laid out, resulting in downsizing the size of the entire illumination unit.

According to another preferable embodiment of the present invention, the illumination unit is configured to comprise an even number of the light source units which are arranged symmetrically with respect to the center of the arrangement. With such a configuration, the illumination unit can uniformly illuminate the original document and compensate for periphery brightness of the optical imaging system.

According to another preferable embodiment of the present invention, an image read apparatus is provided which comprises the above illumination unit; a light receiving element converting an optical signal to an electric signal; and an optical imaging system imaging, on the light receiving element, reflected light from a surface of an original document which has been illuminated by the illumination unit. The image read apparatus as configured above can realize higher optical usage efficiency, lower power consumption, and lower heat emission than the prior art image read apparatus with a tube lamp such as a xenon lamp.

According to another preferable embodiment of the present invention, an image formation apparatus is provided which comprises the above image read apparatus and an image formation unit forming an image according to an image of the original document read by the image read apparatus. Such image formation apparatus can output images in good quality with much less halation due to the specular light reflection from the document surface, and can reduce power consumption.

According to another preferable embodiment of the present invention, the illumination unit is configured to comprise a plurality of light source units arranged in a direction and emitting light as the illumination light, and the light source units are arranged so that a direction in which intensity of light emitted from at least one of the light source units is to be highest makes a non-perpendicular angle with the direction of arrangement of the light source units and that directions in which intensity of light emitted from the respective light source units is to be highest are different from each other, the at least one of the light source units being closest to a center of the arrangement.

With such a configuration, it is possible to reduce the amount of specular light reflection incident on the light receiving element from the surface of the original document by adjusting the angle of illumination light emitted from the light source unit. This makes it possible to reduce the halation occurring in the image reading and realize good image reading.

According to another preferable embodiment of the present invention, in the illumination unit each of the light source units is configured to comprise a light source body emitting the light and a reflection part reflecting all or a part of the light emitted from the light source body to change a direction thereof, the part of the light including light with highest intensity. With such a configuration, it is possible to appropriately set the angle of light (illumination light) emitted from the light source unit by adjusting the reflection part.

According to another preferable embodiment of the present invention, in the illumination unit, the plurality of light source units are arranged so as to satisfy the following expression:

$$\theta b < 90° - 0.5 * \theta a$$

where $\theta a$ is a half-value angle of intensity of the light emitted from the light source unit and $\theta b$ is an angle between a direction in which intensity of light emitted from at least one of the light source units is to be highest and the direction of arrangement, the at least one of the light source units being closest to a center of the arrangement.

With such a configuration, it is possible to reduce the amount of specular light reflection incident on the light receiving element from the surface of the original document by adjusting the angle of illumination light emitted from the light source unit. This makes it possible to reduce the halation occurring in the image reading and realize good image reading and higher illumination efficiency.

According to another preferable embodiment of the present invention, the illumination unit is configured to further comprise a mirror or an optical guiding body reflecting the light emitted from the light source units. With such a configuration, the directions of light emitted from the light source units can be freely set, thereby improving illumination efficiency and energy efficiency. Also, the increase in the degree of freedom for setting the directions enables increase in the flexibility of how the components of the illumination unit are laid out, resulting in downsizing the size of the entire illumination unit.

According to another preferable embodiment of the present invention, the illumination unit is configured to comprise an even number of the light source units which are arranged symmetrically with respect to the center of the arrangement. With such a configuration, the illumination unit can uniformly illuminate the original document and compensate for the periphery brightness of the optical imaging system.

Further, according to another preferable embodiment of the present invention, another image read apparatus is provided which comprises the above illumination unit; a light receiving element converting an optical signal to an electric signal; and an optical imaging system imaging, on the light receiving element, reflected light from a surface of an original document which has been illuminated by the illumination unit.

Such an image read apparatus can be one with higher optical usage efficiency, lower power consumption, and lower heat emission than the prior art image read apparatus using a tube lamp such as a xenon lamp.

According to another preferable embodiment of the present invention, another illumination unit is provided in which a plurality of light source units emitting light as the illumination light are arranged in a direction so as to satisfy the following expression:

$$\theta a \leq D/30$$

where $\theta a$ is a half-value angle of intensity of the light emitted from the light source units and D is a length of an exit plane of the light in the direction of arrangement of the light source units.

With such a configuration, it is possible to reduce the amount of specular light reflection incident on the light receiving element from the surface of the original document by adjusting the divergence of illumination light emitted from the light source unit. This makes it possible to reduce the halation occurring in the image reading and realize good image reading.

According to another preferable embodiment of the present invention, in the illumination unit each of the light source units is configured to comprise a light source body emitting the light and a reflection part reflecting the light emitted from the light source body.

According to another preferable embodiment of the present invention, in the illumination unit the reflection part is configured to reflect the light emitted from the light source body in a direction substantially perpendicular to the direction of the arrangement of the light source units. With such a configuration, the reflection part can be properly set so as to adjust the divergence of the illumination light emitted from the light source unit.

According to another preferable embodiment of the present invention, in the illumination unit the reflection part is configured to comprise a reflective surface which is a diffusive surface. In such a configuration, the directions of the illumination light emitted from the light source units are irregular. This accordingly makes it possible to suppress the halation due to the specular light reflection to a substantially equivalent level to that of the tube lamp such as a xenon lamp.

According to another preferable embodiment of the present invention, the illumination unit is configured to comprise an even number of the light source units which are arranged symmetrically with respect to the center of the arrangement. The illumination unit as configured above can illuminate the original document uniformly and compensate for the periphery brightness of the optical imaging system.

According to another preferable embodiment of the present invention, another image read apparatus is provided which comprises the above illumination unit; a light receiving element converting an optical signal to an electric signal; and an optical imaging system imaging, on the light receiving element, reflected light from a surface of an original document which has been illuminated by the illumination unit.

Such an image read apparatus can be one with higher optical usage efficiency, lower power consumption, and lower heat emission than the prior art image read apparatus using a tube lamp such as a xenon lamp.

Although the present invention has been described in terms of exemplary embodiments, it is not limited thereto. It should be appreciated that variations may be made in the embodi-

What is claimed is:

1. An illumination unit for use in an image read apparatus which illuminates a surface of an original document with illumination light, reads an image of the original document by a light receiving element, and adjusts an amount of specular light reflection from the surface of the original document on a light receiving plane of the light receiving element by adjusting at least one of an incident angle of the illumination light and a divergence thereof, the illumination unit, comprising
a plurality of light source units arranged in a direction and emitting light as the illumination light, wherein
the light source units are arranged so as to satisfy the following expression:

$$\theta a > D/30$$

where $\theta a$ is a half-value angle of intensity of the light emitted from the light source units, and D is a length of an exit plane of the light in the direction of arrangement of the light source units.

2. An illumination unit according to claim 1, wherein the light source units are arranged so that a direction in which intensity of light emitted from at least one of the light source units is to be highest makes a non-perpendicular angle with the direction of arrangement of the light source units, the at least one of the light source units being closest to a center of the arrangement.

3. An illumination unit according to claim 2, wherein the plurality of light source units are arranged so as to satisfy the'following expression:

$$\theta b < 90° - 0.5 * \theta a$$

where $\theta a$ is a half-value angle of intensity of the light emitted from the light source unit and $\theta b$ is an angle between a direction in which intensity of light emitted from the at least one of the light source units is to be highest and the direction of arrangement.

4. An illumination unit according to claim 2, further comprising
one of a mirror and an optical guiding body reflecting the light emitted from the light source units.

5. An illumination unit according to claim 2, wherein:
a number of the light source units is an even number; and
the light source units are arranged symmetrically with respect to the center of the arrangement.

6. An image read apparatus comprising:
an illumination unit according to claim 2;
a light receiving element converting an optical signal to an electric signal; and
an optical imaging system imaging, on the light receiving element, reflected light from a surface of an original document which has been illuminated by the illumination unit.

7. An illumination unit according to claim 1, wherein the light source units are arranged so that a direction in which intensity of light emitted from at least one of the light source units is to be highest makes a non-perpendicular angle with the direction of arrangement of the light source units and that directions in which intensity of light emitted from the respective light source units is to be highest are different from each other, the at least one of the light source units being closest to a center of the arrangement.

8. An illumination unit according to claim 7, wherein the plurality of light source units are arranged so as to satisfy the following expression:

$$\theta b < 90° - 0.5 * \theta a$$

where $\theta a$ is a half-value angle of intensity of the light emitted from the light source unit and $\theta b$ is an angle between a direction in which intensity of light emitted from at least one of the light source units is to be highest and the direction of arrangement, the at least one of the light source units being closest to a center of the arrangement.

9. An illumination unit according to claim 7, further comprising
one of a mirror and an optical guiding body reflecting the light emitted from the light source units.

10. An illumination unit according to claim 7, wherein:
a number of the light source units is an even number; and
the light source units are arranged symmetrically with respect to the center of the arrangement.

11. An image read apparatus comprising:
an illumination unit according to claim 7;
a light receiving element converting an optical signal to an electric signal; and
an optical imaging system imaging, on the light receiving element, reflected light from a surface of an original document which has been illuminated by the illumination unit.

12. An illumination unit according to claim 1, wherein the light source units each comprise a light source body emitting the light and a reflection part reflecting all or a part of the light emitted from the light source body to change a direction thereof, the part of the light including light with highest intensity.

13. An illumination unit according to claim 1, wherein the light source units each comprise a light source body emitting the light and a reflection part reflecting all or a part of the light emitted from the light source body to change a direction thereof, the part of the light including light with highest intensity.

14. An illumination unit according to claim 1, wherein the light source units each comprise a light source body emitting the light and a reflection part reflecting the light emitted from the light source body.

15. An illumination unit according to claim 14, wherein the reflection part reflects the light emitted from the light source body in a direction substantially perpendicular to the direction of the arrangement of the light source units.

16. An illumination unit according to claim 14, wherein the reflection part comprises a reflective surface which is a diffusive surface.

17. An illumination unit according to claim 1, wherein:
a number of the light source units is an even number; and
the light source units are arranged symmetrically with respect to the center of the arrangement.

18. An image read apparatus comprising:
an illumination unit according to claim 1;
a light receiving element converting an optical signal to an electric signal; and
an optical imaging system imaging, on the light receiving element, reflected light from a surface of an original document which has been illuminated by the illumination unit.

19. An image formation apparatus comprising:
an image read apparatus according to claim 18; and
an image formation unit forming an image according to an image of an original document read by the image read apparatus.

* * * * *